July 2, 1963 G. J. CLIFF ETAL 3,095,678
ARTICLE STACKING AND STRAPPING MACHINE
Filed May 18, 1959 19 Sheets-Sheet 6

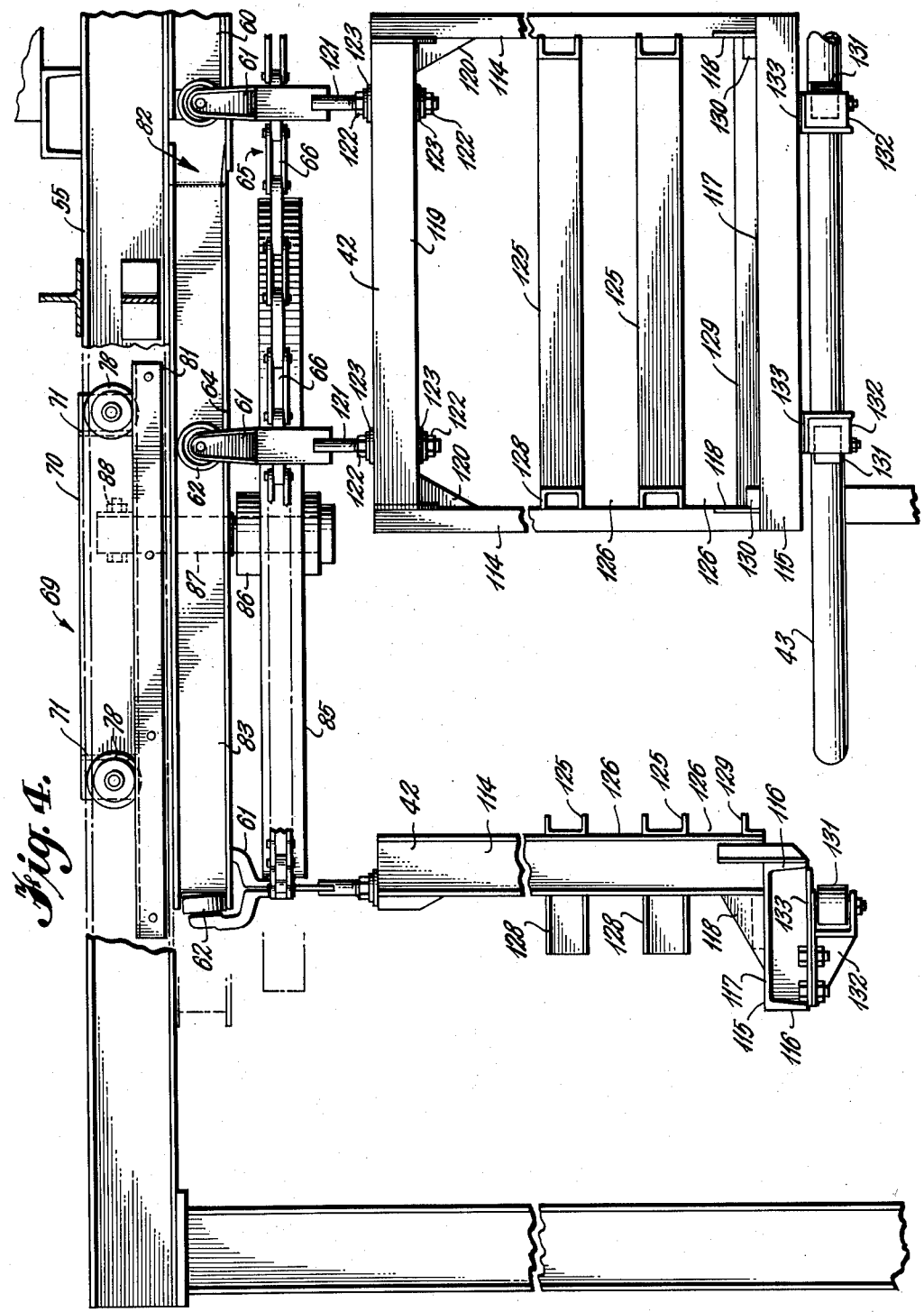

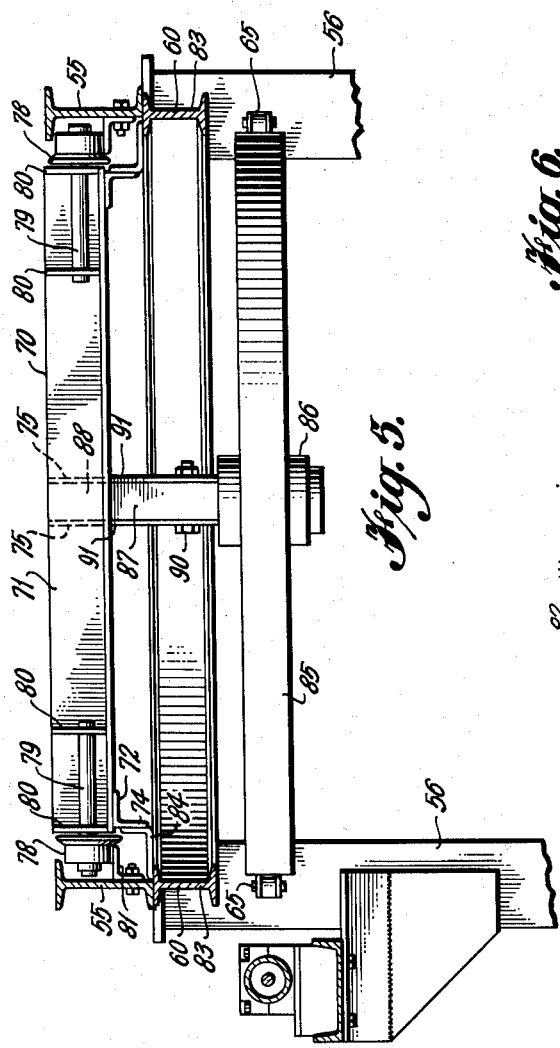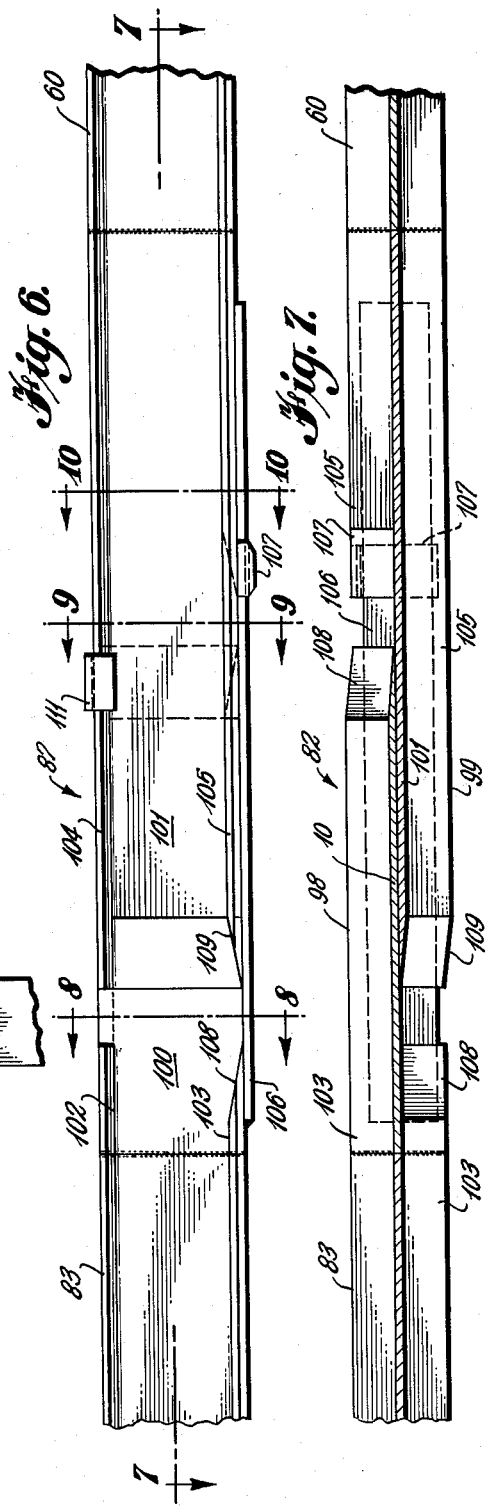

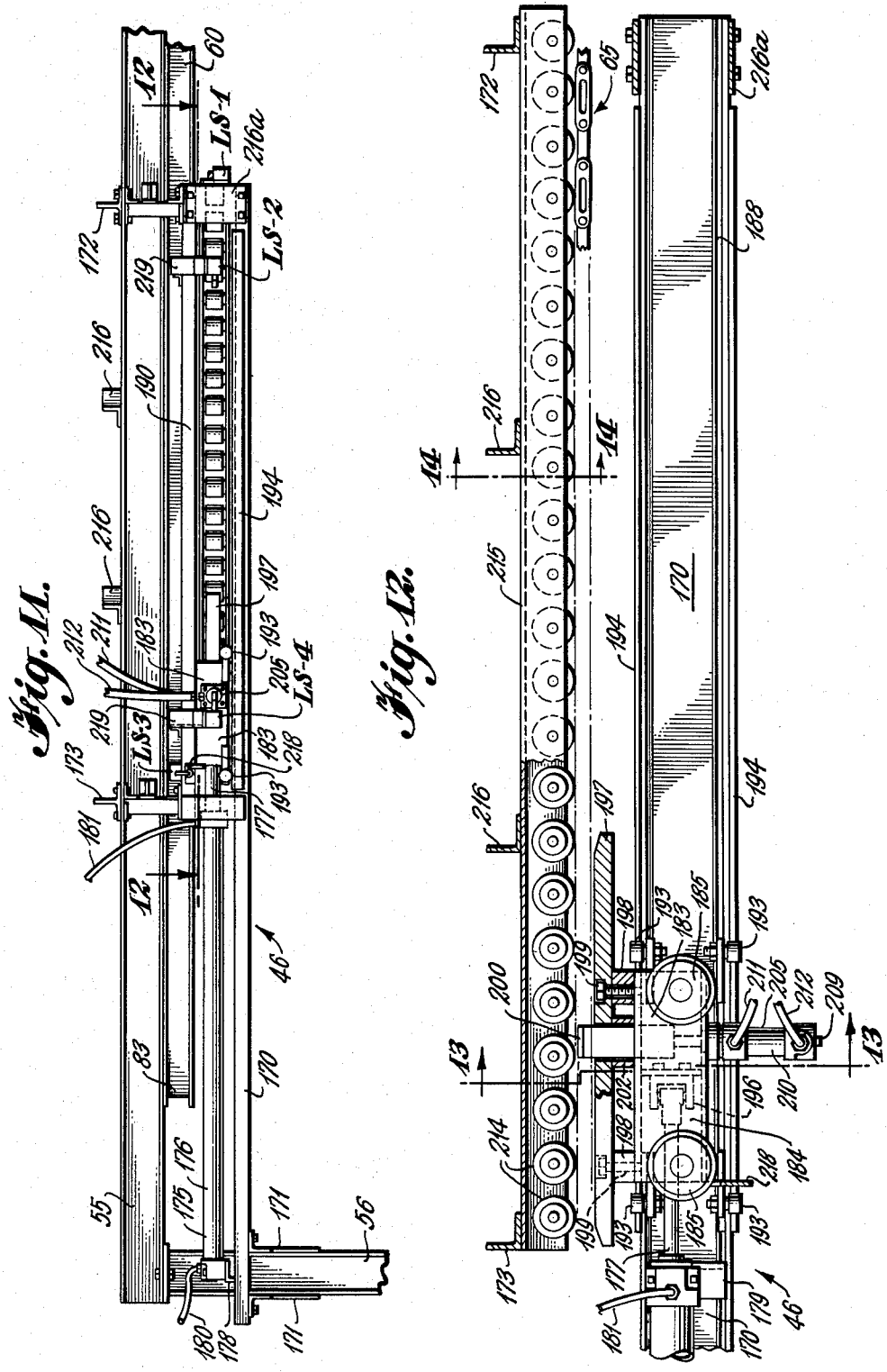

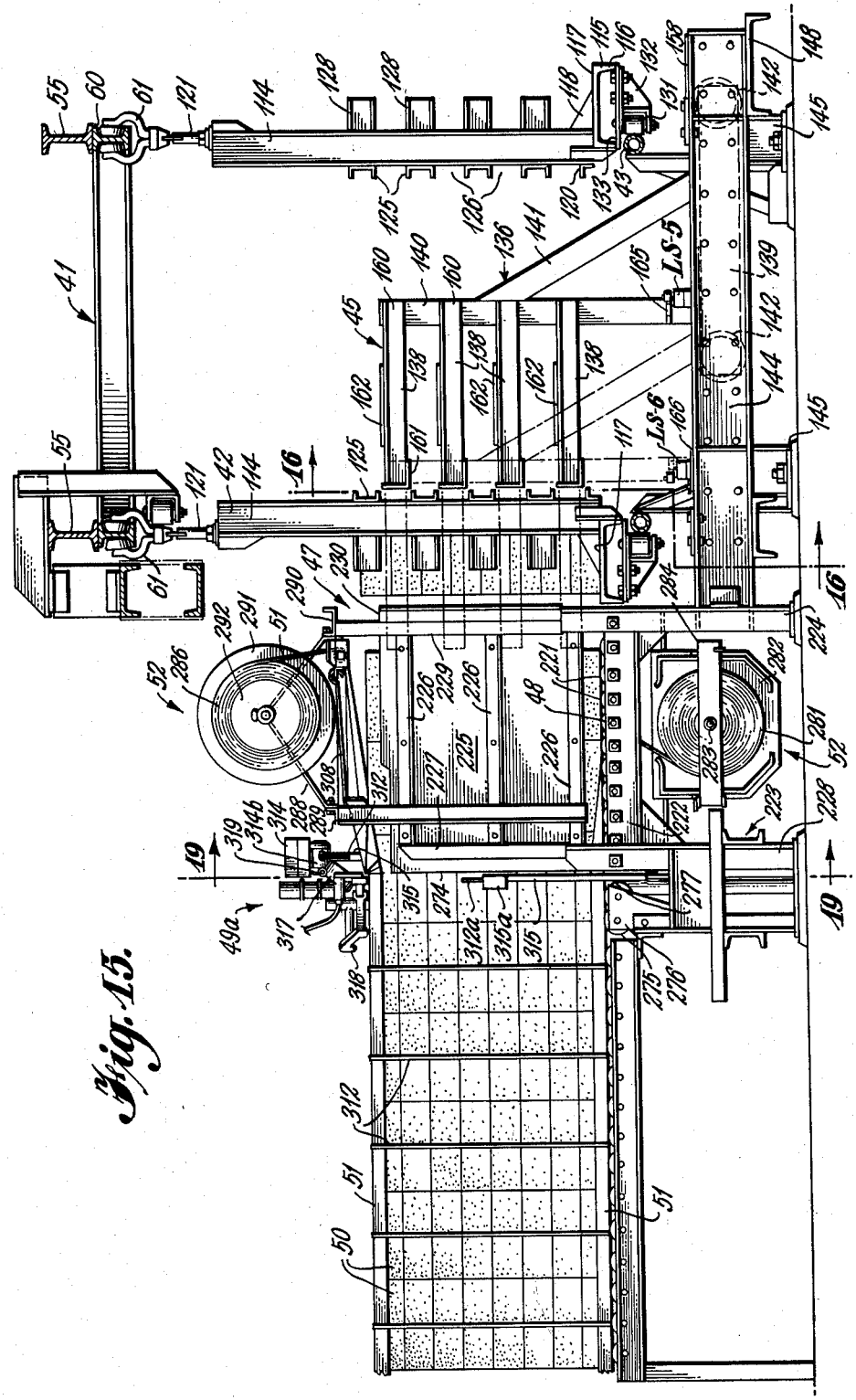

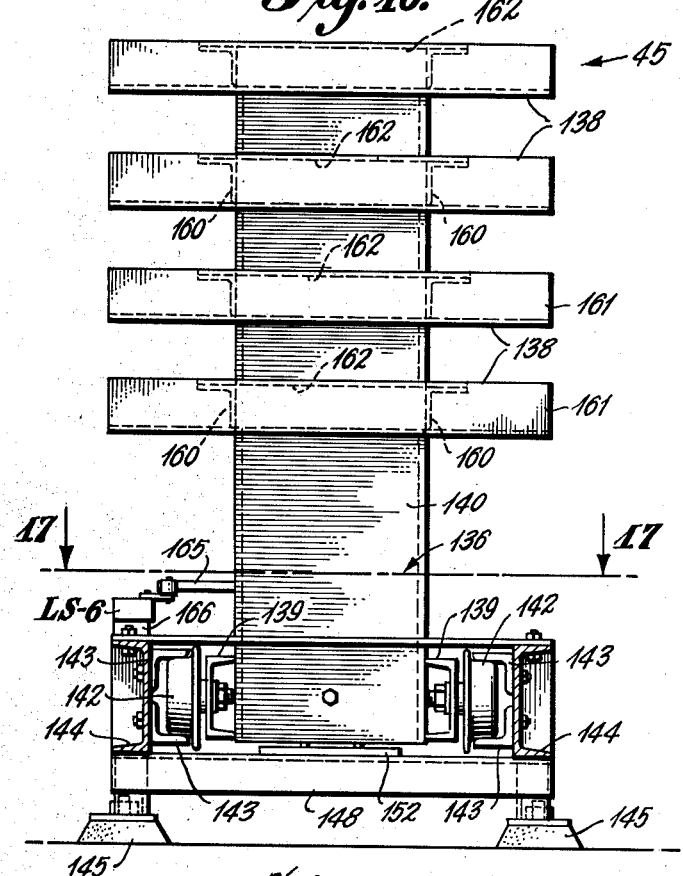
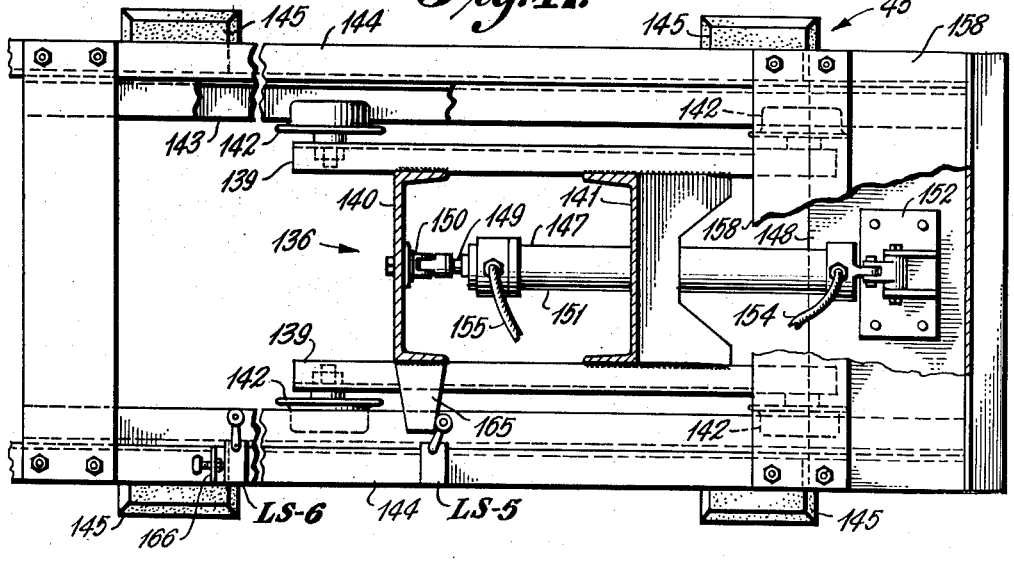

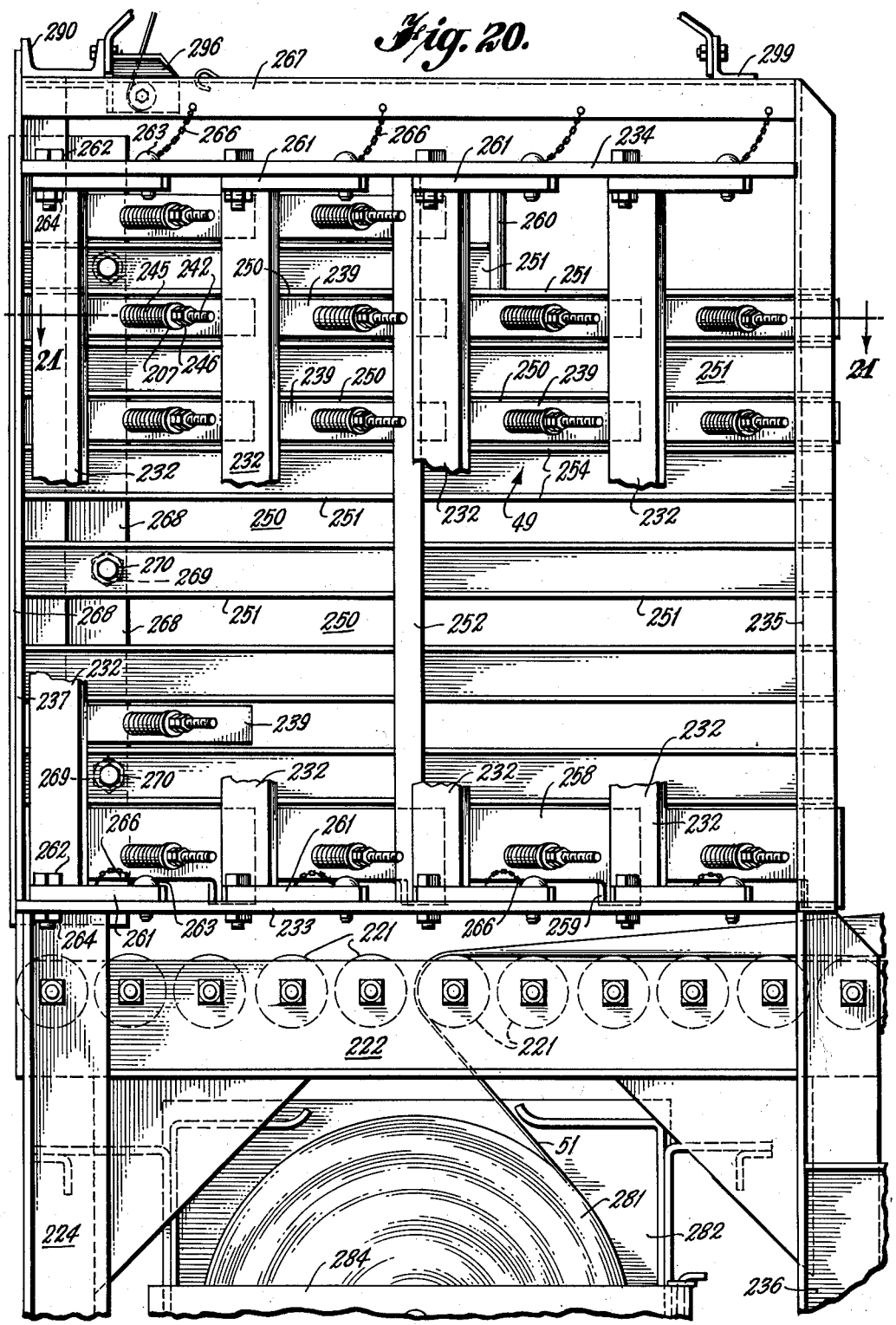

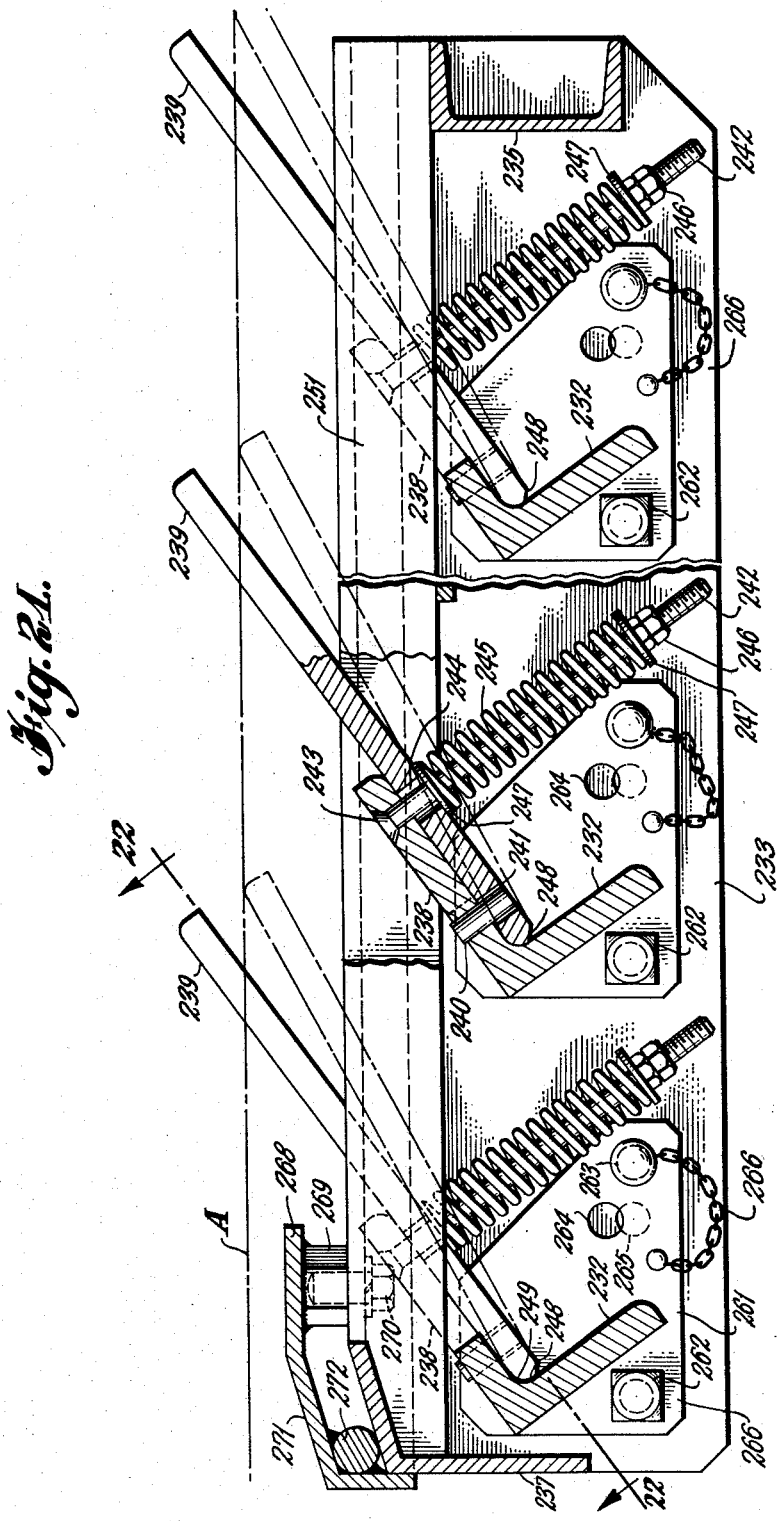

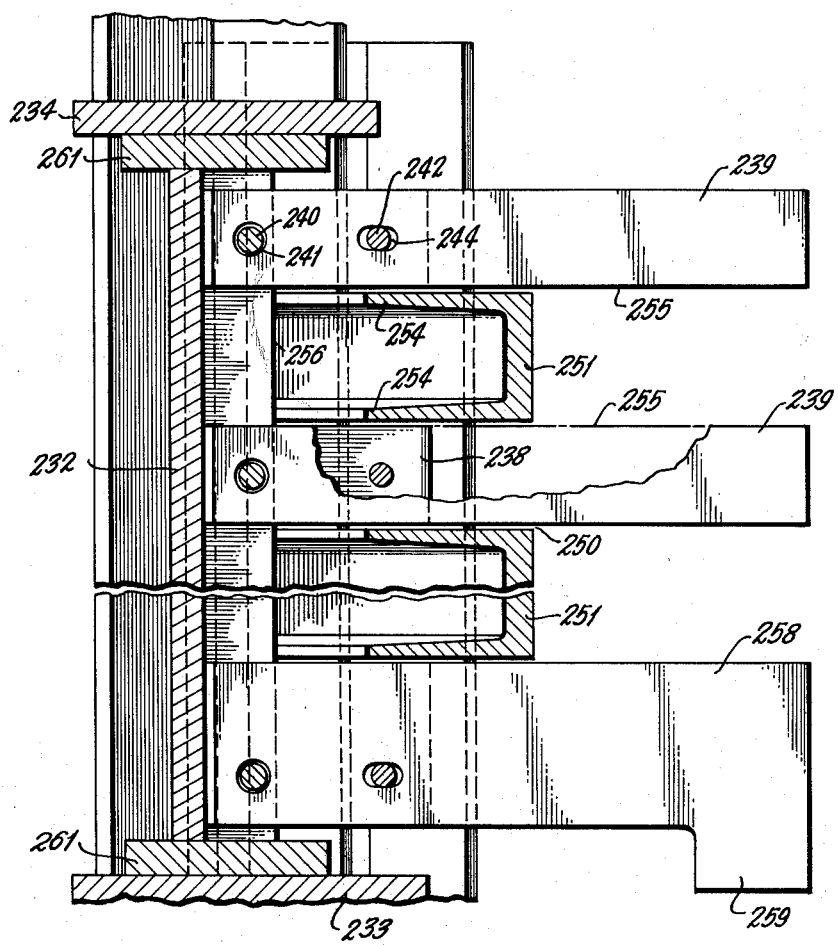

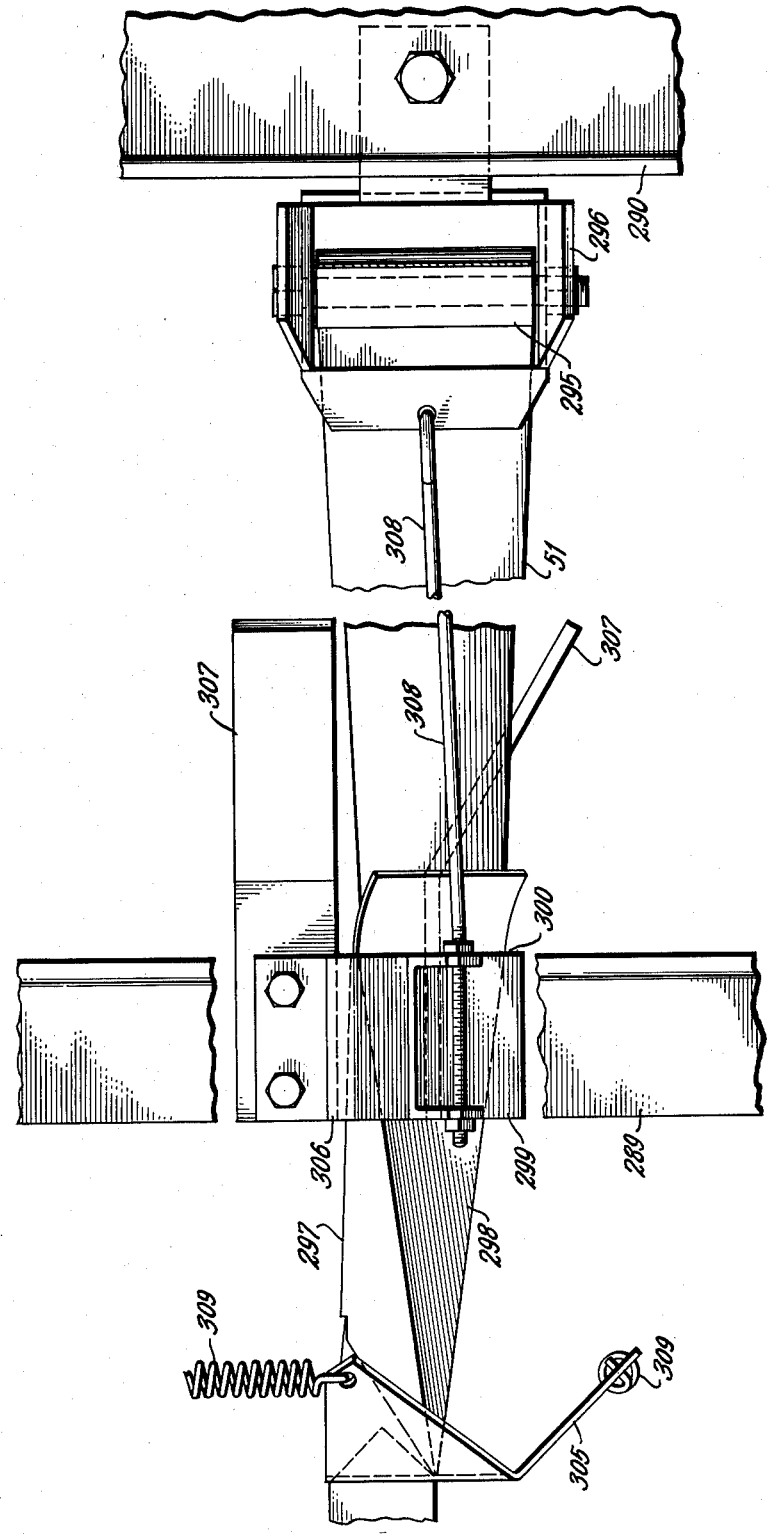

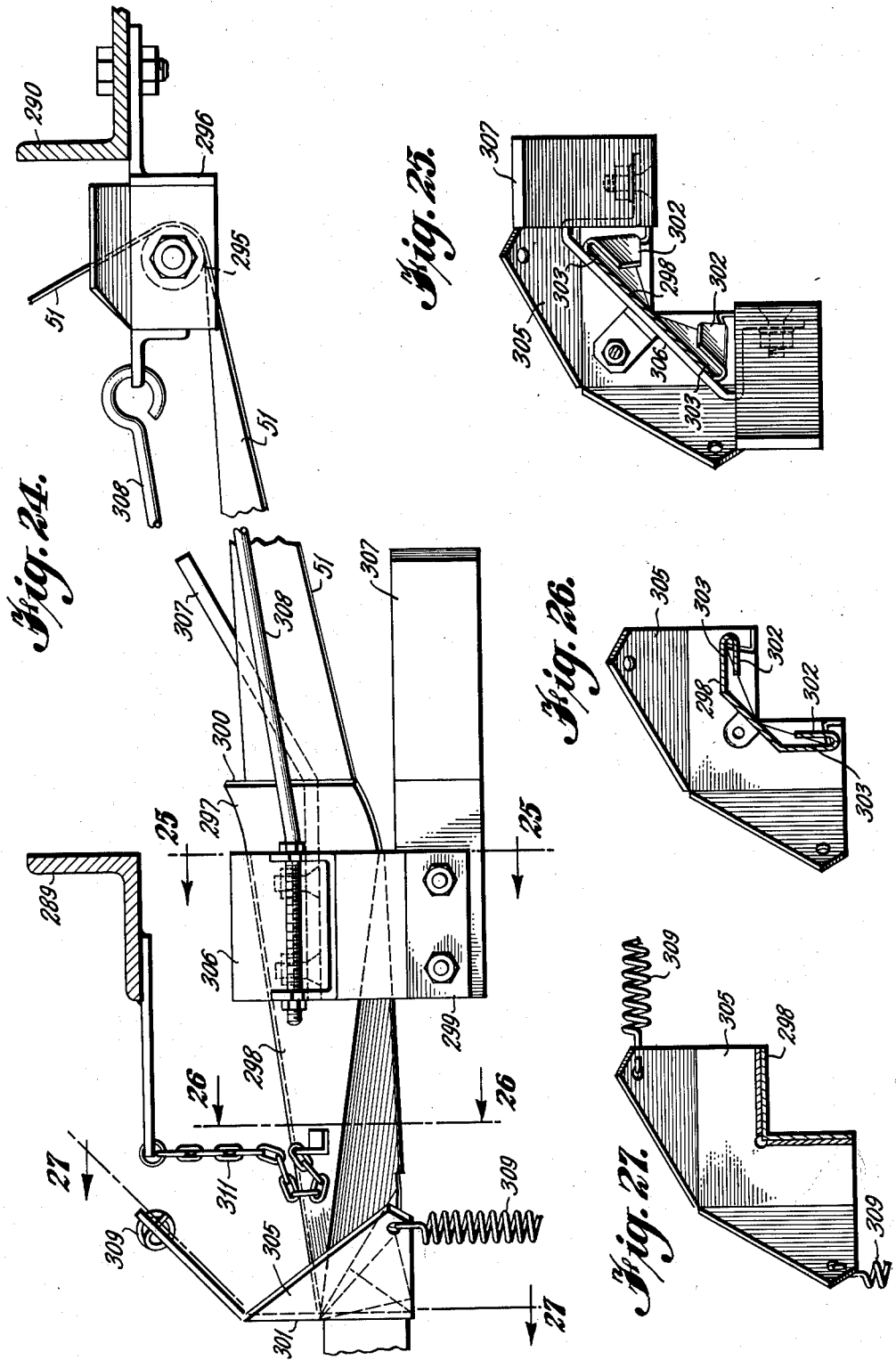

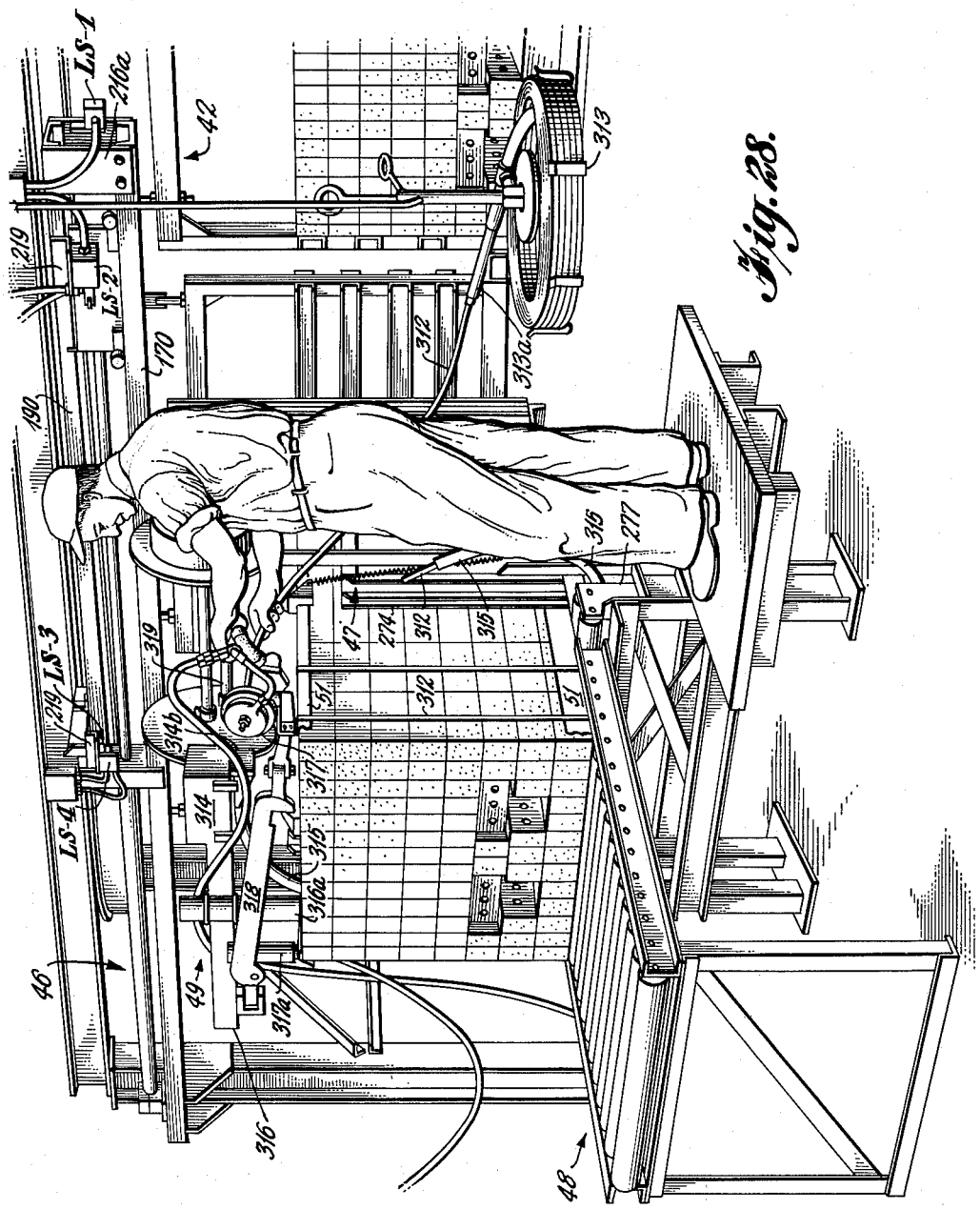

July 2, 1963 G. J. CLIFF ETAL 3,095,678
ARTICLE STACKING AND STRAPPING MACHINE
Filed May 18, 1959 19 Sheets-Sheet 19

United States Patent Office 3,095,678
Patented July 2, 1963

3,095,678
ARTICLE STACKING AND STRAPPING MACHINE
George John Cliff, Chicago, Bert B. Parshall, Wood Dale, William H. Braun, Brookfield, John G. Feldkamp, Homewood, and Robert E. Hager, Park Forest, Ill.; said Cliff, said Parshall, and said Braun, assignors to Link-Belt Company, a corporation of Illinois, and said Feldkamp and said Hager, assignors to Acme Steel Company, Chicago, Ill., a corporation of Illinois
Filed May 18, 1959, Ser. No. 813,769
18 Claims. (Cl. 53—124)

This invention relates to a machine for arranging articles of a uniform size and shape into stacks and for applying a strap to each stack to form the same into a self-sustaining package or bundle.

This invention finds utility in many areas, particularly those involving the shipping, or other handling, of a large number of identical articles which are so shaped that they may be arranged into orderly stacks. For the purpose of illustration, the invention has been shown and described as applied to the packaging of bricks; however, it is to be understood that the invention is not limited to the handling of such articles, but may be applied equally to other articles of uniform size and of such shape as to be susceptible of orderly stacking.

For example, kilns used in producing brick generally are capable of burning green brick to various shades of a color which a specific clay will produce. When packaging brick, it may be desirable that some packages be assembled from brick that are of a fairly uniform shade, while other packages be assembled by mixing brick of various shades. Because masons will lay the brick that are delivered to them, without paying any attention to variation or similarity of shades, a wall produced entirely from brick packaged in accordance with either one of the above mentioned plans will be automatically finished without creating a patched, striated or barber-pole effect. All known prior packaging machines are incapable of producing such shaded or blended packages unless the brick is in some way segregated according to color before being brought to the machine.

The primary object of this invention is to provide a machine for packaging articles, such as bricks, which requires little packaging material and which is otherwise economical to operate so that the cost of the articles in the packaged condition is only slightly higher than when they are handled in a loose condition.

Another object of this invention is to provide a device for forming articles, such as bricks, into orderly stacks and for applying straps to the stacks to obtain compact banded bundles, such device being semi-automatic in its operation so as to require a minimum of manual effort and supervision.

Another object of this invention is to provide a packaging machine facilitating the segregation of articles according to color, shade, or other visual characteristics, during the operation thereof to permit the production of packages each containing articles of a desired uniformity or blend of colors or shades, or other desired characteristics.

Another object of this invention is to provide an article stacking and strapping machine wherein the articles are formed into orderly stacks in an assembly-line fashion by being loaded onto jigs as the latter are conveyed past a number of loading stations, and which includes mechanism for removing each assembled stack as it arrives at an unloading station.

A further object of this invention is to provide mechanism for compacting each stack of articles after it is removed from its conveying jig at the unloading station; applying protective material to each corner edge of the compacted stack, and finally applying a strap completely around each stack to retain the latter in a package or bundle suitable for handling and transporting as a unit.

Still another object of the invention is to provide a machine of the above character which may be adjusted so as to produce packages of bricks in different time cycles, with the result that the machine is suitable for use with plants having widely varying daily production capacities.

Further objects and advantages of the invention will be apparent during the course of the following description.

In the accompanying drawings forming a part of the specification and in which like numerals are employed to designate like parts throughout the same, FIGURE 1 is a perspective view of an article stacking and strapping machine embodying this invention, FIGURE 2 is a partial plan view of the machine shown in FIG. 1, FIGURE 3 is an enlarged plan view of the take-up mechanism for the trolley conveyor portion of the machine, FIGURE 4 is an elevational view taken on line 4—4 of FIG. 3, with some of the parts being broken away to show other structural features, FIGURE 5 is a vertical sectional view taken on line 5—5 of FIG. 3, FIGURE 6 is a fragmentary elevational view of the conveyor track showing one of the expansion joints employed in the take-up mechanism, FIGURE 7 is a horizontal sectional view taken on line 7—7 of FIG. 6, FIGURE 8 is a vertical sectional view taken on line 8—8 of FIG. 6, FIGURE 9 is a vertical sectional view taken on line 9—9 of FIG. 6, FIGURE 10 is a vertical sectional view taken on line 10—10 of FIG. 6, FIGURE 11 is an elevational view of the mechanism employed for driving and indexing the trolley conveyor, FIGURE 12 is a horizontal sectional view taken on line 12—12 of FIG. 11, FIGURE 13 is an enlarged, vertical sectional view taken on line 13—13 of FIG. 12, FIGURE 14 is a vertical sectional view taken on the line 14—14 of FIG. 12, FIGURE 15 is a vertical sectional view showing the mechanism employed at the unloading and strapping station, FIGURE 16 is a vertical sectional view taken on line 16—16 of FIG. 15, FIGURE 17 is a horizontal sectional view taken on line 17—17 of FIG. 16, FIGURE 18 is a plan view of the mechanism for compacting the stacked articles and for applying a strip of protective material to each edge of the stack, the mechanism being shown with no articles therein, FIGURE 19 is a vertical sectional view taken on line 19—19 of FIGURE 15, FIGURE 20 is an elevational view, partly broken away to show various details, of the mechanism for compacting the articles in a stack and for applying a protective strip to each edge of the stack, FIGURE 21 is a horizontal sectional view taken on line 21—21 of FIG. 20, FIGURE 22 is a fragmentary sectional view taken on line 22—22 of FIG. 21, FIGURE 23 is a plan view of the guide employed for folding a strip of protective material around one of the upper edges of a stack of articles, FIGURE 24 is an elevational view of the mechanism of FIG. 23.

FIGURE 25 is a vertical sectional view taken on line 25—25 of FIG. 24,

FIGURE 26 is a vertical sectional view taken on line 26—26 of FIG. 24,

FIGURE 27 is a vertical sectional view taken on line 27—27 of FIG. 24,

FIGURE 28 is a perspective view of the article strapping station of the machine of FIG. 1.

Figure 1:
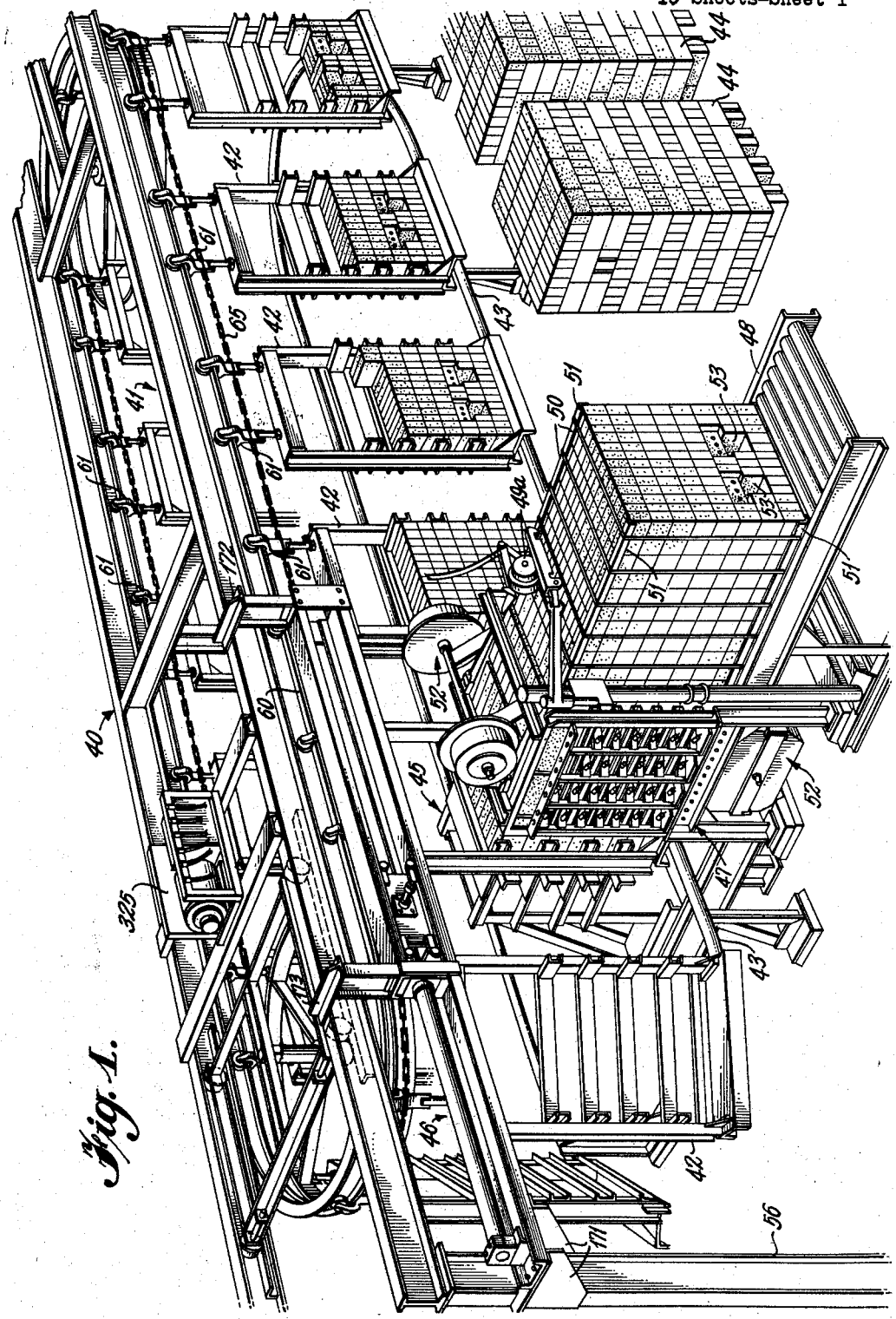

In the drawings, wherein for the purpose of illustration is shown the preferred embodiment of this invention, and first particularly referring to FIG. 1 for a general description of the illustrated embodiments, there is shown a machine 40 for arranging brick into orderly stacks and for applying metal bands to the stacks so formed to produce self-sustaining packages. This machine includes an overhead trolley conveyor 41 with a plurality of suspended stacking jigs 42 that are moved through an endless path, and that are guided at their lower ends by a guide rail 43. At various stations along the endless path traveled by the jigs 42, operators remove bricks from supply piles 44 and place them onto the jigs in a given arrangement as the jigs are brought in succession to each stacking station.

Generally at each stacking station each jig is supplied with a number of bricks which comprise only a fraction of a complete stack, a complete stack being built progressively as the jig advances past the various stacking stations. Also, the supply piles 44 may be brought directly from the kiln to the machine 40, in which case they are likely to contain bricks of various shades. In loading the jigs 42, an operator may therefore select bricks from the supply piles 44 within his reach to match in shade the bricks already on the jig, or to produce a certain desirable pattern or blending of shades in the completed stack.

At one point along the path of jig movement is a reciprocating unloader 45 which functions to push completed stacks from the jigs 42. The jigs are moved successively, in a step-by-step manner, to the unloader 45 by a mechanism 46 which intermittently drives the conveyor 41. With each driving period of the mechanism 46, a new jig 42 is brought to the unloader for removal of the stack thereon, and between each driving period is a dwell period during which the movement of the jigs 42 is stopped and which is variable at will to obtain a dwell time suiting the particular output desired. It is during this dwell period that the bricks are loaded onto the jigs at the various stacking stations.

In front of the unloader 45 is a device in the nature of a hollow form 47 for receiving the stacks of bricks as they are removed from the jigs and for holding the bricks in each stack in the same arrangement as they were previously placed on the jigs. The bottom of the form 47 comprises a free roller conveyor 48 over which the stacks are moved in a straight line by face-to-face contact between successive stacks. That is, all of the stacks on the conveyor 48 are advanced a distance equal to the thickness of one stack by each new stack that is moved onto the conveyor by the unloader. One side of the form 47 includes pressure means 49 for engaging the sides of the stacks as they move through the form and for crowding the articles in each stack toward the opposite wall of the form so as to produce a more tight and compact arrangement of the articles in the stack.

Adjacent the forward end of the form 47 is strapping mechanism 49a which operates to apply a metal strap around each of the compacted stacks leaving the form 47 so as to tie such stacks into self-sustaining bundles or packages 50. Before the stacks are strapped, however, a strip of protective material 51, such as cardboard, is applied to each corner edge of each stack by a strip feeding and bending mechanism 52, located above and below the form 47, to protect the corner bricks of each stack from damage by the straps.

The roller conveyor 48 extends outwardly for some distance beyond the sides of the form 47 to support a number of strapped packages 50. In the present case, the bricks in each stack are shown in an arrangement providing two openings 53 adjacent the bottom of each strapped package 50 through which the prongs of a fork truck may be inserted to remove one or more packages from the conveyor 48. When so removed, the protective strips 51 are readily torn to separate the packages lifted by the fork truck from the packages remaining on the roller conveyor.

Figure 2:
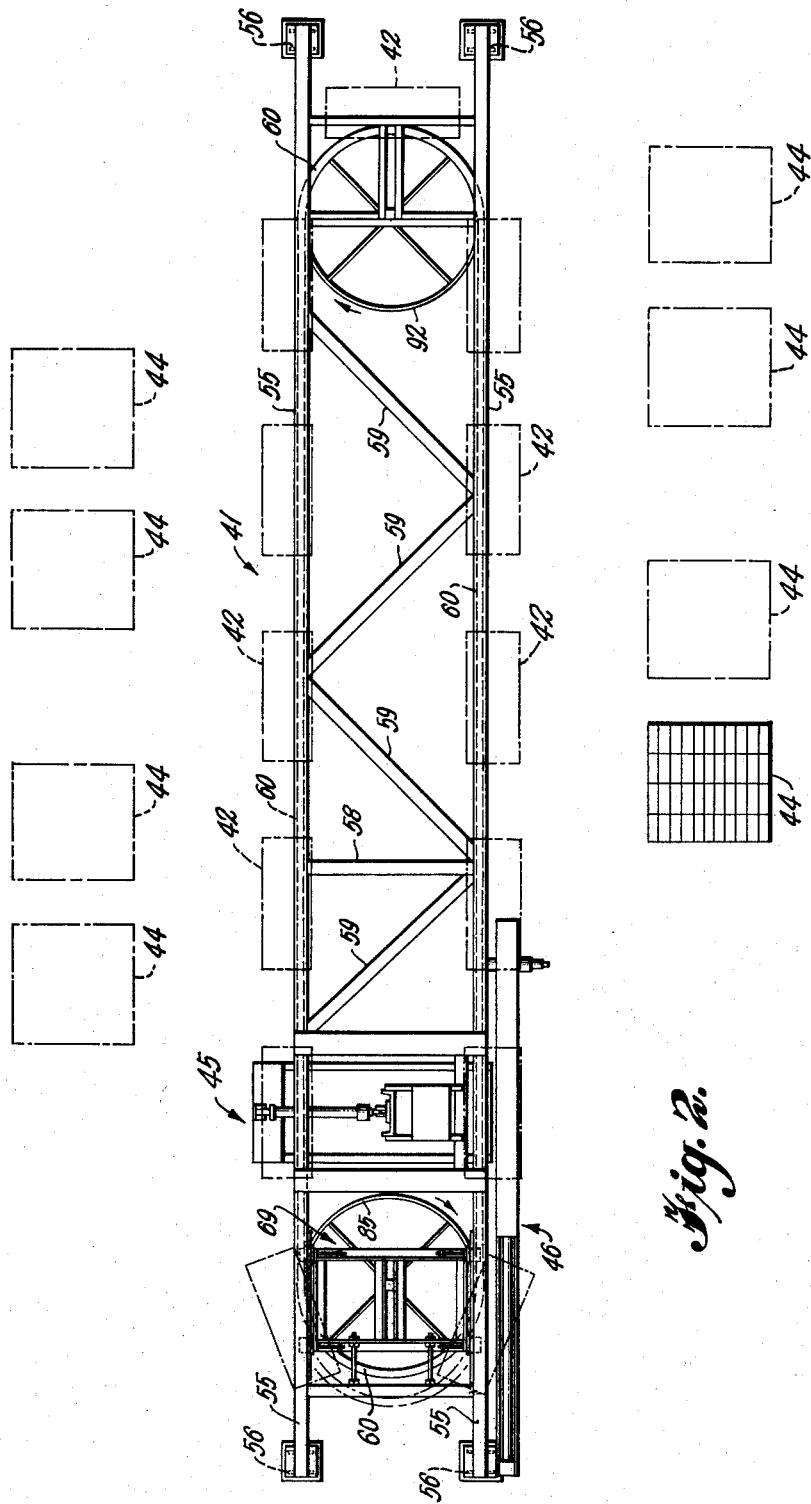

Turning now to a detail description of the various components of the machine 40, and first considering the overhead trolley conveyor 41, it will be noted from FIG. 2 that the conveyor includes two elevated I-beams 55 which are placed in spaced parallel relationship and supported at their ends by posts 56. The I-beams 55 are connected by a transverse strut 58 and several diagonal struts 59 to produce a more rigid structure. As best seen in FIGS. 1, 4, 5, 11 and 13, the I-beams serve as supports for the underlying endless track 60 formed of smaller I-beams. At each end of the pair of I-beams 55, the track 60 is shaped to provide return bends.

The track 60 supports a desired number of trolleys 61 each having a pair of wheels 62 which ride on the upper surfaces of the lower flange 64. The trolleys 61 support the jigs 42, as hereinafter described, and are connected by a traction chain 65 of such a construction as to provide uniformly spaced openings 66.

As viewed in FIG. 2, a takeup mechanism 69 is mounted at the left-hand end of the pair of I-beams 55 for the purpose of removing slack from the traction chain 65. As seen best in FIGS. 3, 4 and 5, the takeup mechanism 69 includes a movable carriage 70 comprising two transverse angle members 71 which are spaced longitudinally of the I-beams 55 and which are connected by two longitudinal angle members 72. The longitudinal angle members 72 are located near the ends of the members 71 and are secured thereto, as shown in FIG. 5, so as to provide downwardly directed flanges 74 extending the length of the carriage 70. The transverse angle members 71 are also joined by two other angle members 75 that are located near the middle of the carriage 70 and are equally spaced on opposite sides of the carriage centerline to define a central opening 76.

Figure 3:
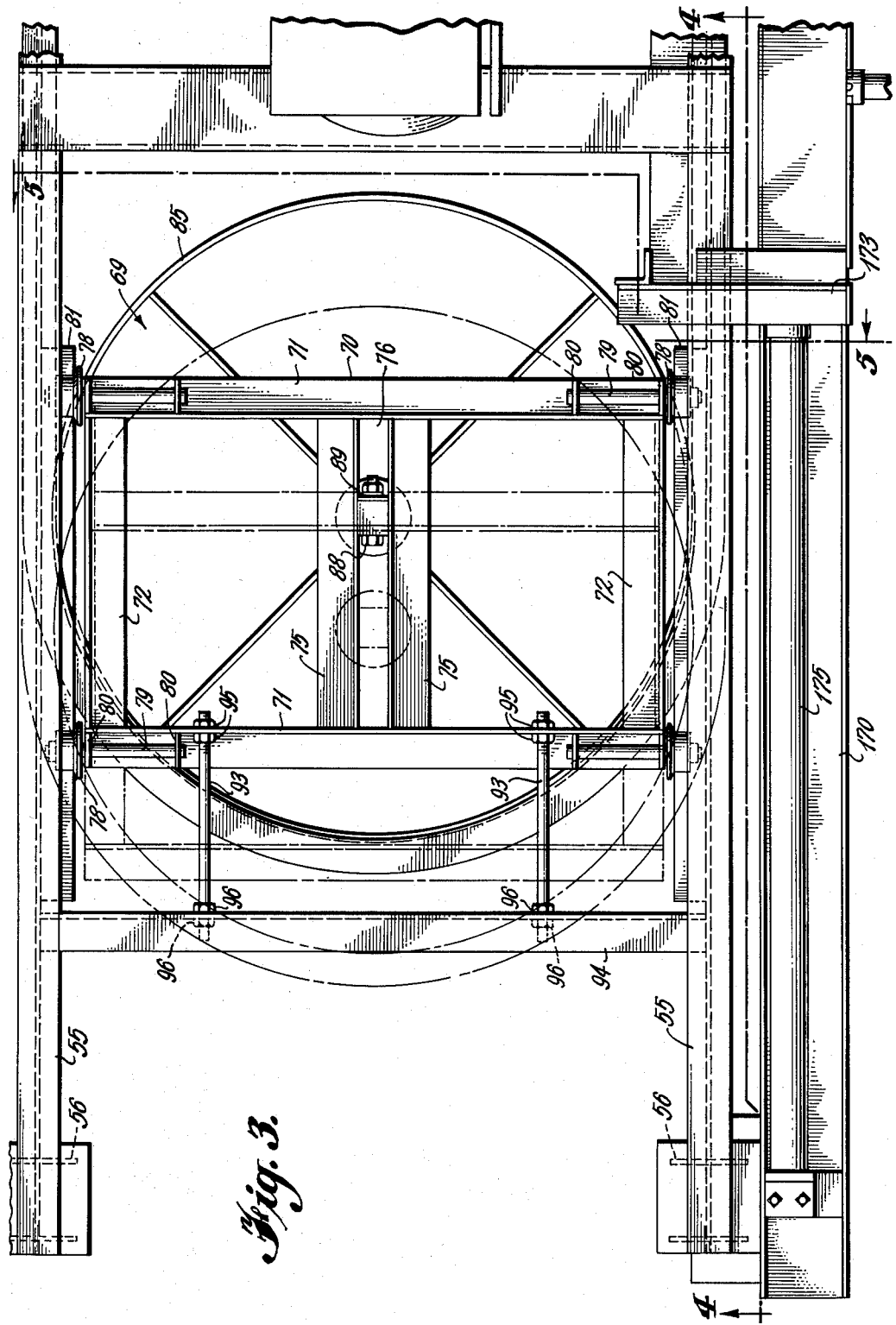

To movably support the carriage 70, a wheel 78 is rotatably connected to each end of each of the transverse angle members 71. As best seen in FIGS. 3 and 5, each of the wheels 78 is loosely mounted on the outer end of a stub shaft 79 that passes through and is welded to each of two spaced gussets 80 connected to the corresponding end of the transverse angle members 71. The wheels 78 ride on tracks 81 that are bolted to the inner surfaces of the webs of the I-beams 55. The tracks 81 extend for some length along the I-beams 55 to permit movement of the carriage 70 between various positions of adjustment, two of which are shown by the solid lines and the broken lines of FIG. 3.

By means of two expansion joints 82, see FIG. 4, located one on either side of the return bend 83 in the track 60, this end portion is movable with respect to the remainder of the track 60. This movable return bend 83, see FIG. 5, is connected to the carriage 70 by means of two angle members 84, each having an upwardly directed flange welded to the downwardly directed flange 74 of one of the angle members 72 and a horizontal flange welded to the upper surface of the return bend. It also will be noted from this same figure that the inner parts of the lower flanges of the I-beams 55 are removed from below the carriage track 81 to accommodate the horizontal flanges of the angle members 84. Thus, the return bend 83 of the track is supported directly by, and will move with, the carriage 70. The upper surface of the return bend will slide along the bottom surfaces of the I-beams 55 during such movement.

The carriage 70 also serves to support a rotatable wheel 85 used to guide the traction chain 65 around the path defined by the return bend 83. The wheel 85 is journaled by a bearing assembly 86 on the depending portion of the shaft 87 that extends upwardly through the central opening 76 in the carriage 70. The squared upper end portion of the shaft 87 is fixed to the carriage by a bolt 88 which passes through the shaft and a plate 89 welded between the angle members 75, and a bolt 90 which passes through the lower end portion of the shaft and a pair of spaced side plates 91 that are welded one to each of the angle members 75 and extend downwardly from the latter.

As viewed in FIG. 2, a similar wheel 92 is located at the right-hand end of the I-beams 55 for guiding the traction chain around this return bend portion of the track. This latter wheel, however, is not movable with respect to the I-beams as is the wheel 85.

The positions of the carriage 70, the return bend 83 and the wheel 85, are adjusted by means of two takeup screws 93 that extend between the outer transverse angle member 71 and a stationary angle member 94 fixed between the I-beams 55. Pairs of lock nuts 95 and 96 are threaded on the opposite ends of the screws 93 to retain the said elements 70, 83 and 85 in their desired adjusted positions.

The expansion joint 82 used to connect each of the ends of the return bend 83 to the remainder of the track 60 is shown in more detail in FIGS. 6 to 10. Referring first to FIGS. 6 and 7, each side of the return bend 83 has an end section 98 that overlaps the end section 99 of the associated side of the track 60, with the web 100 of the section 98 flatly engaging the web 101 from the section 99. On the side facing the web 101, the section 98 has both its upper and lower flanges 102 and 103 cut away for some distance from the end of the web 100 to provide clearance for the web 101, the upper flange 104 and the lower flange 105 of the section 99. Likewise, on the side facing the web 100 both the upper and lower flanges 104 and 105 of the end section 99 are cut away some distance from the end of the web 101 to provide clearance for the web 100, the upper flange 102 and the lower flange 103 of the end section 98.

Figure 8:
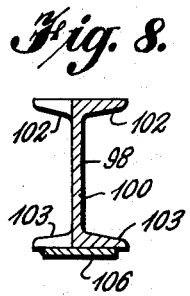
Figure 9:
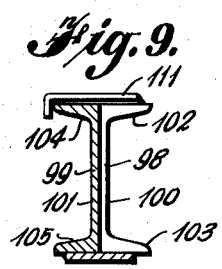
Figure 10:
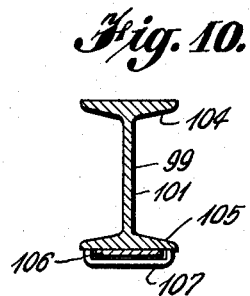

A plate 106 extends along and below the overlapped end sections 98 and 99. One end of the plate 106 is welded to the lower surface of the flange 103 of the end section 98 while the other end of the plate 106 fits through a U-shaped strap 107 welded to the lower surface of the flange 105 of the end section 99, as shown in FIGS. 8 and 10. The ends of the lower flanges 103 are tapered as at 108 to provide inclined transition surfaces between the upper surfaces of the flanges 103 and the upper surface of the plate 106. Similarly, the ends of the lower flanges 105 are tapered as at 109 to provide similar transition surfaces. Thus, the plate 106 serves both as a guide for keeping the end sections 98 and 99 in proper alignment and also as a continuation of the trolley supporting surfaces between the spaced ends of the flanges 103 and the flanges 105. An additional guide for maintaining the end sections 98 and 99 in proper alignment is provided by an L-shaped bracket 111, one arm of which extends across the overlapped flanges 102 and 104 and has one end welded to the flange 102, and the other arm of which extends downwardly from the other end of the first arm, as shown in FIG. 9, to prevent lateral movement between the end sections 98 and 99.

Turning next to FIGS. 4 and 15 for a detail description of the jigs 42, it will be noted that each jig includes two side channel members 114 and a bottom channel member 115 connected between the lower ends of the side members 114 with its flanges 116 directed downwardly to provide a flat loading surface 117 along the bottom of the jig. The bottom channel member 115 extends forwardly from the side channel members 114 and a gusset plate 118 is welded in the corners as shown to provide greater strength. The upper ends of the side channel members 114 are connected by a cross-beam 119, with reinforcing gussets 120. The cross-beam 119 is supported from two spaced trolleys 61 each having a downwardly extending threaded shaft 121 that passes through the cross-beam and which is secured thereto by a pair of opposed nuts 122 and washers 123.

The rear vertical surface of each jig 42 is defined by a number of horizontally disposed and vertically spaced rear channel members 125 connected between the side channel members 114, as shown in FIG. 4, with their flanges directed rearwardly. The spacing between adjacent pairs of the rear channel members 125 define horizontal openings 126 in the rear wall of the jig which serve a purpose hereinafter described. The inside surfaces of the side channel members also have connected thereto a number of short horizontally disposed channel members 128 each of which is vertically aligned with a corresponding one of the rear channel members 125. An angle member 129 is connected between the bottom ends of the side channel members in spaced relation to the lowermost rear channel member 125 to define another opening 126 in the rear wall of the jig. In front of each end of the angle member 129 is a spacer block 130 which extends forwardly along the loading surface 117 and inwardly toward the opposite side of the jig the same distance as the members 128.

The bottom of each jig 42 is guided by a pair of rollers 131 which engage the lower guide rail 43 to prevent swinging movement of the jig. Each of the rollers 131 is supported by a suitable bracket 132 which is connected to a plate 133 welded between the downwardly directed flanges 116 of the bottom channel member 115.

As best seen in FIGS. 1 and 15, the jigs 42 each serves to support a plurality of bricks which are manually placed on the jigs a few at a time and in a given arrangement to produce stacks of a given overall size and shape. The bricks are arranged on each of the jigs in tiers with the first tier being supported by the surface 117 and positioned by the angle members 129 and spacer members 130 and with each subsequent tier being supported by the preceding tier and positioned in vertical alignment therewith by the appropriate channel members 125 and 128.

As hereinafter described, the complete stack of bricks is unloaded from each jig by pusher members on the unloader 45 which move through the openings 126 in the rear wall of the jig. It is therefore desirable that the rear channel members 125 be so located that a portion of each tier of bricks is aligned with one of the openings 126 so as to be engaged by the unloader 45 and positively moved thereby from the jig during the unloading operation. The short channel members 128 and the spacer blocks 130 serve to space the ends of each tier of bricks from the side channel members 114 to provide ample clearance for the unloader 45 when it moves through the jig.

The structure of the unloader 45, referred to above, is best seen in FIGS. 15, 16 and 17. From these, it will be noted that the unloader 45 includes a carriage or frame 136 mounted for reciprocating movement toward or away from a jig 42 positioned at the unloading station, with the frame having attached thereto a number of forwardly extending pusher arms 138 which are adapted to move through the openings 126 in the rear wall of the jig when the frame is moved forwardly.

As seen best in FIGS. 16 and 17, the movable frame 136 comprises a pair of laterally spaced bottom channel members 139, a substantially vertical channel member 140 connected between the bottom members 139 near the forward ends thereof, and an inclined channel member 141 connected between the bottom members near the rear ends thereof so as to slope upwardly and forwardly to be joined to the vertical member 140 at a point spaced above the bottom members. Each of the bottom members is also provided with a pair of wheels 142 which are adapted to ride upon a pair of spaced tracks 143 each fixed to the inside surface of one of a pair of laterally spaced side beams 144, as shown in FIG. 16. The side beams 144 and the tracks 143 are mounted on a suitable foundation 145 and extend transversely between the two straight portions of the track 60, the unloader frame 136 being mounted for movement within the space between the two straight track portions.

To reciprocate the unloader 45 along the tracks 143, a double acting hydraulic ram 147 is connected between the frame 136 and a channel member 148 that is welded between the rear ends of the side beams 144. The hydraulic ram 147 includes a piston rod 149 pivotally connected at its outer end to the bottom of the vertical channel member 140 by a suitable fitting 150, and a cylinder 151 pivotally connected at its base end to the channel member 148 by a bracket 152. Pressure fluid is supplied to the cylinder 151 through a conduit 154 connected to the base end and a conduit 155 connected to the rod end. The application of pressure fluid to the conduit 154 and the venting of the conduit 155 will cause extension of the piston rod 149 to move the unloader 45 forwardly, while the application of pressure fluid to the conduit 155 and the venting of the conduit 154 will cause retraction of the piston rod 149 and rearward movement of the unloader. To protect the base end of the hydraulic ram 147 from dirt and brick chips that may fall from jigs passing thereover, a cover 158 is placed over and above the side beams 144 along the rear portion thereof.

The arms 138 on the unloader 45, which simultaneously engage and push the tiers of bricks from a jig, each includes two horizontal angle members 160 welded at equal height to the opposite sides of the vertical channel member 140 so as to extend forwardly therefrom. To the forward ends of each pair of members 160 is welded a pusher member 161 which extends an equal distance laterally outwardly from each of the members 160. A plate 162 is welded across the top of each pair of members 160 to produce a more rigid structure. The pusher members 161 are of proper size to pass through the openings 126 in the rear of each jig 42 and engage the tiers of bricks along their full lengths so that all of the bricks will be positively moved by the pusher members from the jig 42 during an unloading operation.

The operation of the unloader 45 is controlled by an electro-hydraulic system which will be hereinafter described in detail. For the present, however, it may be noted that the control system includes two limit switches LS–5 and LS–6 that are mounted on top of one of the side beams 144 for operation by a cam 165 welded to the side of the vertical channel member 140 of the frame 136. As seen best in FIGS. 15 and 17, the rear limit switch LS–5 is positioned so as to be engaged and operated by the cam 165 when the frame 136 is moved to its innermost position, as illustrated by the solid lines of FIG. 15. Likewise, the forward limit switch LS–6 is positioned so as to be operated by the cam 165 when the frame 136 is moved to its outermost position, as illustrated by the broken lines of FIG. 15. As will hereinafter be apparent, the forward limit switch LS–6 determines the forward extent of the frame movement and, therefore, is preferably mounted on an adjustable bracket 166 whereby it may be moved to various positions along the length of the side beam 144 to vary the stroke of the unloader 45 and thereby the forward extent of the movement of the pusher members 161.

Referring now to FIGS. 11 to 14, inclusive, for a detail description of the mechanism 46 for intermittently advancing the conveyor 41 in a step-by-step manner to locate the jigs 42 in alignment with the unloader 45, it should be noted that the advancing mechanism 46 is located near the takeup end of the conveyor 41 on the side thereof adjacent the unloading roller conveyor 43.

The advancing mechanism 46 includes a bottom channel member 170 supported at one end on one of the posts 56 by brackets 171, and supported at its other end and near the middle of its length from the associated I-beam 55 by an end bracket 172 and a middle bracket 173, respectively. The channel member 170 is placed with its flanges directed upwardly and extends parallel to the I-beam 55 a suitable distance from the post 56 so that between the middle bracket 173 and the end bracket 172 it parallels a straight portion of the track 60.

Mounted on the channel member 170 between the post 56 and the middle bracket 173 is a hydraulic ram 175 having a cylinder 176 and a piston rod 177. The cylinder 176 is mounted at its base end on a bracket 178 located near the post 56 and is mounted at its rod end on a bracket 179 located near the middle support bracket 173, with the piston rod 177 extending beyond the middle bracket 173 toward the end bracket 172. Conduits 180 and 181 connected to the base and rod ends of the cylinder 176, respectively, are used to supply pressure fluid to and vent it from the opposite ends of the ram 175. The application of pressure fluid to the conduit 181 and the venting of the fluid from the conduit 180 will cause the piston rod 170 to be retracted and the application of pressure fluid to the conduit 180 and the venting of fluid from the conduit 181 will cause the piston rod 177 to be extended.

To transmit the movements of the piston rod 177 to the traction chain 65, a drive carriage 183 is connected to the outer end of the rod 177 for movement thereby. As seen best in FIGS. 12 and 13, the drive carriage 183 includes a boxlike hollow body 184 to which are attached a pair of top wheels 185 and a similar pair of bottom wheels 186. The bottom wheels 186 are attached to the bottom wall 187 of the body 184 for rotation about vertical axes and are positioned within the flanges of the channel member 170 which serves as a track for these wheels, the channel member including a wear strip 188 welded to the inside of its outer flange. The upper wheels 185 are rotatably mounted on the upper wall 189 of the body 184 for rotation about vertical axes and are positioned between the downwardly directed flanges of another channel member 190 which is positioned directly above the member 170. The channel member 190 also includes a wear strip 191. From the foregoing, it will be evident that the wheels 185 and 186 confine the drive carriage 183 to movements in a straight line along the channel member 170 and prevent it from being displaced laterally away from the path of movement of the jigs 42.

The drive carriage 183, also, is supported vertically by four wheels 193 which are mounted near the bottom and at each of the four corners of the body 184. The wheels 193 ride on track strips 194 welded to the outside surfaces of the flanges of the channel member 170, see FIG. 13. The piston rod 177 extends through a portion of the hollow body 184 and is pivotally connected to a bracket 196.

On the side of the drive carriage body 184 facing the traction chain 65 is mounted an elongated shoe 197 which is spaced from the body 184 by blocks 198 and is fastened thereto by bolts 199.

Figure 13:
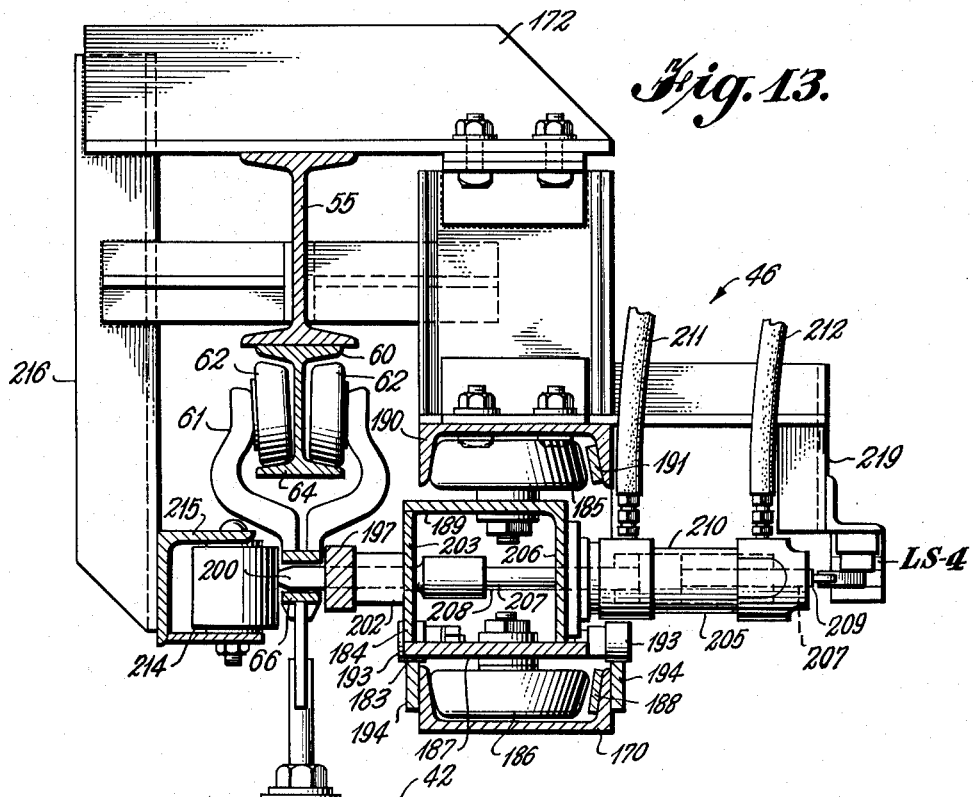

To provide for driving engagement between the carriage 183 and the traction chain 65, the carriage includes a drive pin 200 which fits loosely through a horizontal opening formed through the middle of the shoe 197, through a guide collar 202 located between the shoe 197 and the body 184, and through the side wall 203 of the body 184, as seen best in FIGS. 12 and 13. The pin 200 is movable laterally with respect to the carriage 183 into an extended position to enter an opening 66 in the traction chain 65 to establish a connection between the chain and the drive carriage 183 when the latter is moved by the hydraulic ram 175.

Movement of the pin 200 between an extended, chain engaging position and a retracted position free of the chain is effected by a small hydraulic ram 205 mounted on the outer side 206 of the drive carriage body 184. The hydraulic ram 205 includes a piston rod 207 having an inner end 208 which extends through the side 206 of the body 184 for connection to the pin 200 and an outer end 209 which protrudes beyond the outer end of the ram cylinder 210. Pressure fluid is supplied to the ram 205 by conduits 211 and 212 connected to the inner and outer ends of the cylinder 210, respectively. Venting of the conduit 211 and supplying of pressure fluid to the cylinder through the conduit 212 causes the pin 200 to be moved to its extended chain-engaging position and the outer end 209 of the piston rod 207 to be moved to a retracted position, as shown in FIG. 13. On the other hand, venting of the conduit 212 and supplying of pressure fluid to the conduit 211 will cause the pin 200 to be moved to a retracted position free of the chain and simultaneously cause extension of the outer end 209 of the piston rod 207.

Figure 14:
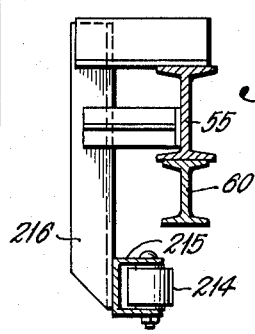

On the opposite side of the chain 65 from the drive carriage 183 there is provided a series of backup rollers 214 which serve to engage the chain 65 to prevent its movement away from the drive pin 200. The rollers 214 are mounted between the arms of the U-shaped frame 215 which is supported by the middle bracket 173 and at the other end by the end bracket 172. Additional support for the frame 215 is provided by brackets 216 connected to the I-beam 55, as shown in FIG. 14.

At this point, it should be noted that the jigs 42 are uniformly spaced on the conveyor 41 and that the stroke of the hydraulic drive ram 175 is equal to this spacing. Therefore, each drive stroke of the ram will advance the jigs so that the jigs will be successively positioned in operative alignment with the unloader 45.

It will be noted at this point that the control system for the stacking and strapping machine 40 includes four limit switches LS–1, LS–2, LS–3 and LS–4, which are operated by the intermittent drive mechanism 46, see FIGS. 11 and 28. The limit switch LS–1 is supported on plates 216a connecting the ends of the channel members 170 and 190 so as to be engaged and operated by the end of the shoe 197 when the carriage 183 is moved to its outermost position by extension of the piston rod 177; and the limit switch LS–3 is mounted on the channel member 190 so as to be engaged and operated by an arm 218 fixed to the carriage 183 when the carriage is moved to its innermost position by retraction of the piston rod 177. The limit switches LS–2 and LS–4 are mounted by brackets 219 on the channel member 190 and are adapted to be engaged and operated by the outer end 209 of the piston rod 207 of the ram 205 when the piston rod is retracted to disengage its pin 200 from the chain 65 and when the drive carriage 183 reaches the opposite limits of its path of movement.

Referring now to FIGS. 15 and 18 to 22, inclusive, for a detail description of the form 47, it will be seen that its bottom is formed by the conveyor 48 which comprises a bed of rollers 221 rotatably mounted between two spaced channel members 222. These channel members are supported by suitable framing 223 at a height which will locate the tops of the rollers 221 at a level equal to or just silghtly below the load carrying surfaces 117 of the jigs 42 when the latter are positioned adjacent the form 47. The framing 223 includes two rear legs 224 which are positioned to support the roller conveyor 48 directly in front of the unloader 45 and closely spaced in relation to the forward flange 116 of the bottom channel member 115 of each jig 42 at the unloading station.

Figure 19:
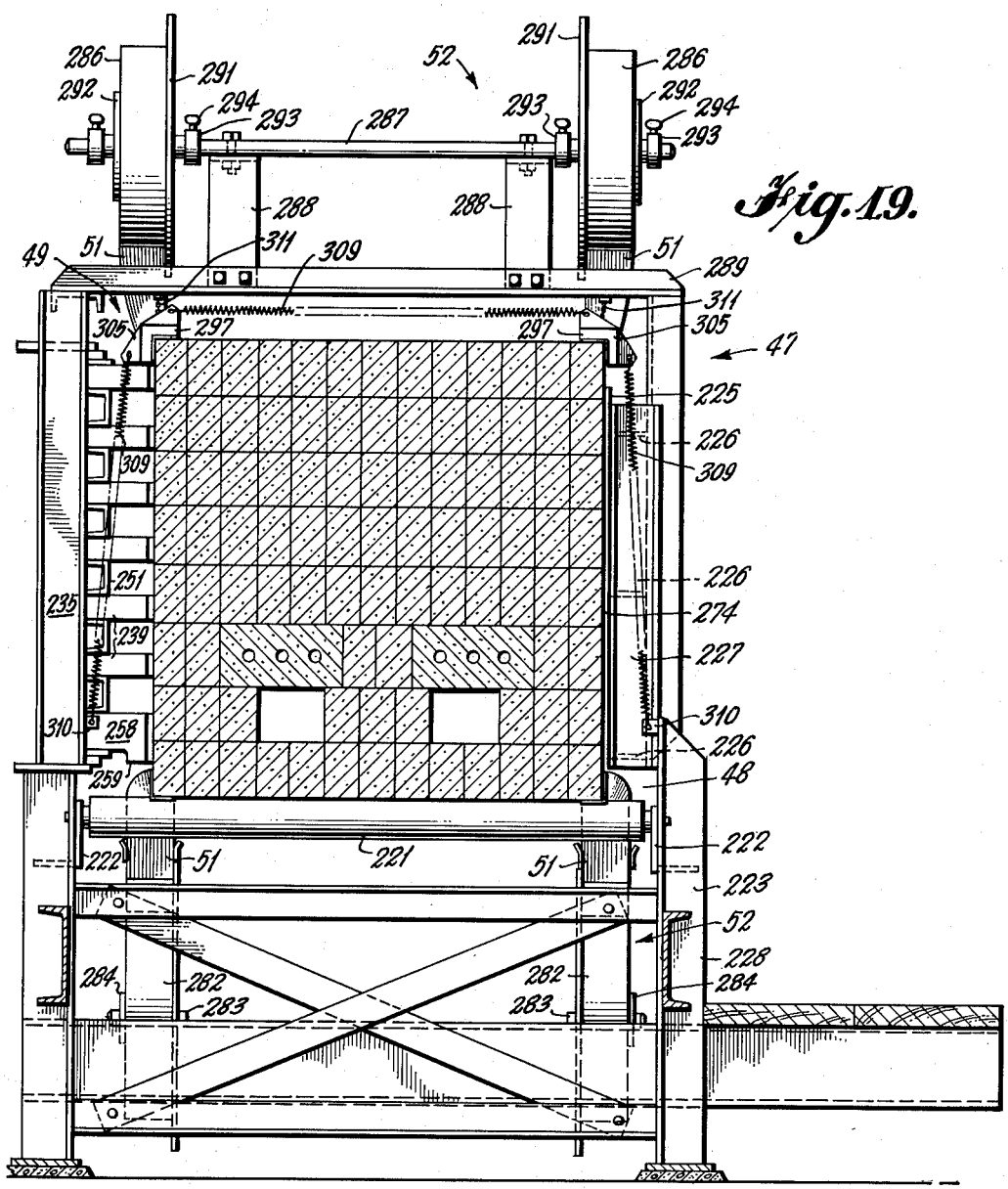

As seen best in FIG. 19, one side of the form 47 comprises a vertical plate 225 which is supported on the framing 223 so as to extend above the tops of the rollers 221. From FIG. 15, it will be seen that the plate 225 is supported by three horizontal channel members 226, a vertical forward member 227, by means of which the plate is attached to a forward leg 228 of the framing, and a vertical rear member 229 which is connected to the corresponding rear leg 224.

Figure 18:
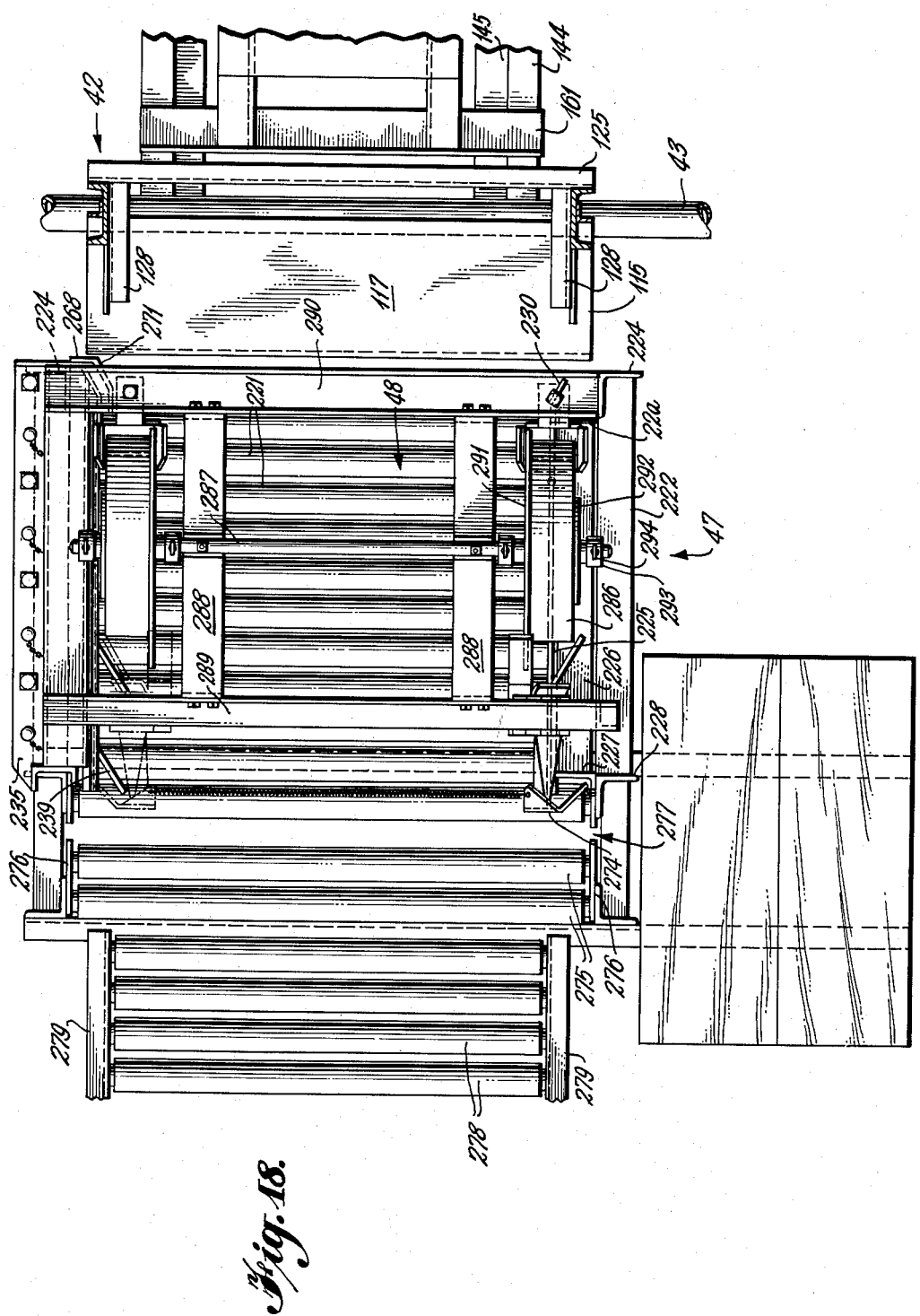

As noted previously, the conveyor drive mechanism 46 is adapted to index each jig 42 at a given location when brought to the unloading station; and this location is preferably such that the stack of bricks on the jig will have its adjacent side aligned with the inner surface of the plate 225 due to the positions of the channel members 128, see FIG. 18. At its inner end the plate 225 is bent laterally outwardly, as at 230, to aid in guiding the stacks onto the conveyor 48.

The other side of the form 47 includes the pressure means 49 for engaging the tiers of bricks forming a stack for forcing or crowding them toward the plate 225 to thereby compact each stack. Referring to FIGS. 19, 20 and 21, the pressure means includes four vertical standards 232 which extend between a lower mounting plate 233 and an upper mounting plate 234. Both of the mounting plates extend horizontally between, and are connected to, an outer channel member 235, which is supported by and extends vertically upward from the outer leg 236 of the framing 223, and an inner vertical member 237, which extends upwardly from one of the inner legs 224 of the framing.

The standards 232 are L-shaped in cross-section and are positioned so as to have one flange 238 directed generally inwardly and forwardly as shown in FIG. 21. At spaced locations along the height of each of the standards 232, are positioned a plurality of pressure fingers 239 which are attached to the flange 238 and extend inwardly beyond the latter for engagement with the sides of the stacks of bricks positioned in the form 47, the paths followed by the sides of the stacks being indicated by the broken line A in FIG. 21.

Each of the pressure fingers 239 is resiliently mounted on its associated flange 238 by means of a stud 240 which is fixed to the flange 238 and passes through an opening 241 in the inner end of the finger having a diameter substantially larger than that of the stud 240. Outwardly from the stud 240 is a bolt 242 which passes through the flange 238 and a longitudinally elongated opening 244 in the finger 239. A helical spring 245 surrounds the outer portion of the bolt 242 and is compressed between the finger and the outer end of the bolt by a pair of locking nuts 246 threaded on the latter. Washers 247 are positioned at both ends of the spring 245.

The springs 245, when no bricks are in the form 47, urge the fingers against their flanges 238, as shown by the solid lines of FIG. 21. When stacks of bricks are in the form, however, the outer ends of the fingers 239 will engage the sides of the stacks and will be held thereby in the deflected positions shown by the broken lines of FIG. 21 against the force of the springs 245. Thus, each finger applies the force of its spring to a stack of bricks tending to crowd the stack toward the plate 225 on the opposite side of the form. The inner end of each finger 239 is rounded at 248 to pivotally engage the corner 249 of the associated standard 232.

As seen best in FIGS. 20 and 22, the fingers 239 operate within horizontal openings 250 defined by a plurality of vertically spaced members 251 that extend horizontally between the outer vertical channel member 235 and the inner vertical member 237 and are connected intermediate their ends to a middle vertical support 252. The members 251 are U-shaped in cross-section and have their flanges 254 located in closely spaced relation to the side edges 255 of the fingers so as to serve as guides for the latter. The vertical standards 232 are positioned partly within the openings 250 between the members 251, with the flanges 238 thereof being notched as at 256 between the fingers 239 to accommodate the members 251 as shown in FIG. 22.

By reference to FIGS. 19 and 20, it will be noted that the lower ends of the standards 232 are mounted some distance above the tops of the rollers 221. Therefore, the lowest finger 258 on each standard is somewhat wider than the other fingers 239 due to a downward extension 259 on its outer end portion to assure contact with the bottom tier of bricks passing through the form 47. Also, from FIG. 20, it will be noted that pressure fingers 239 have been omitted from the upper ends of the two outer standards 232 and that the uppermost horizontal member 251 has been cut away, except for its flange 254, forwardly of the post 260 to provide room for various parts of the means, hereinafter described, for applying a protective strip of material to the upper corner edges of the stacks of bricks passing through the form. The post 260 is welded to the uppermost horizontal member 251 and the upper mounting plate 234 to provide additional support for the flange 254 which extends beyond the post.

To permit the use of the pressure fingers 239 with different stacks of different widths, the standards 232 are adjustably mounted on the upper and lower plates 234 and 233, respectively, in such a manner that the inward extent of the fingers 239 may be changed by rotating the standards 232 about their vertical axes. This is accomplished, as seen best in FIGS. 20 and 21, by providing each end of each standard 232 with an index plate 261 which lies flat against the corresponding mounting plate 233 or 234. Each index plate 261 is pivotally connected to its corresponding mounting plate by a bolt 262 and a locking pin 263 which is passed through registering holes in the index and mounting plates. Each bolt 262 is held in place by a nut 264 while each pin 263 is readily removable by hand. When the pins 263 are removed from both ends of a standard 232, the latter may be pivoted around the bolts 262 to bring into registration a different pair of openings 264 and 265 after which the pins may be replaced to hold the index plates in their new positions.

As will be evident from FIG. 21, the fingers 239, when in their new positions, will extend a lesser distance inwardly toward the opposite vertical plate 225 and will, therefore, cooperate with stacks of bricks of greater width. To prevent misplacement of the removed pins 263, each is provided with a length of chain 266 which, in the case of the lower pins, is connected to the corresponding index plate and, in the case of the upper pins, is connected to a horizontal channel member 267.

To aid in guiding the stacks of bricks from the jigs 42 into the form 47, a vertical guide plate 268, see FIGS. 18, 20 and 21, is fastened to the inner ends of the horizontal members 251 by spacer nuts 269, welded to the guide plate 268, and bolts 270 which pass through the members 251 and are threaded into the nuts 269. Rearwardly of the spacer nuts 269, the guide plate 268 is bent at a small angle outwardly to provide an inclined guide surface 271, and, past this guide surface, is bent directly outwardly so as to engage in overlapping relationship a portion of the rear member 237. A rod 272 is disposed between the guide plate 268 and the member 237, and is welded to the guide plate, to prevent the latter from being bent by bricks which may be moved into engagement therewith. By reference to FIG. 20, it will be noted that only three bolts 270 are employed to hold the guide plate 268 in place and that therefore the latter may be readily removed for repair or replacement when worn.

At this point, it should be mentioned that the outer standard 232 is so located that the vertical row of fingers 239 and 258 mounted thereon will engage the side of a stack of bricks along a line that is substantially opposite the forward vertical edge 274 of the plate 225, see FIGS. 15, 18 and 19. Furthermore, the stroke of the unloader 45 is so adjusted that each time a new stack is moved into the form 47 another stack is moved partially out of the form so that slightly more than one-half of the latter stack will extend beyond the forward edge 274 while the remainder of the stack remains in the form and is held in a compact condition between the forward portion of the wall 225 and the outer row of pressure fingers 239. This can best be appreciated from FIG. 15 wherein it will be noted that the forward extent of movement of the unloader 45 is such that after the completion of each unloading stroke two stacks of bricks will be positioned completely within the form 47 while a third stack is located partly within and partly beyond or outside the form.

To support the stacks as they leave the form 47, the roller conveyor 48, see FIGS. 15 and 18, includes two rollers 275 located beyond the remaining rollers 221 of the conveyor. The rollers 275 are the same width and height as the rollers 221, but are supported by separate end brackets 276 which are spaced somewhat from the supporting members 222 for the rollers 221 to provide a gap 277. Beyond the rollers 275, the conveyor 48 is formed of somewhat narrower rollers 278, supported between side members 279, which serve to support a number of completed brick packages 50 while awaiting their removal by a fork truck, or other means.

FIGS. 15, 18, 19, 20, and 23 to 27, inclusive, will now be referred to for a detailed description of the means 52 for applying a protective strip 51 of cardboard, or the like, to each of the four corner edges of the stacks of bricks. First considering the application of the strips to the lower edges, it will be noted from FIGS. 15 and 19 that two spools 281 of the strip material 51 are provided and are retained in cartridges 282 which are supported on the framing 223 beneath the roller conveyor 48. Each of the cartridges includes a short shaft 283 over which the spool is placed and a hinged door 284 at one side for retaining the spool 281 on the shaft and in the cartridge. As viewed in FIG. 19, the right-hand cartridge 282 is positioned so that the strip of material fed therefrom is located approximately equally on opposite sides of the inner surface of the vertical wall 225, and therefore equally on the opposite sides of the lower right-hand corner edge of the stacks of bricks passing through form 47. The left-hand cartridge 282 is likewise so positioned that the strip of protective material 51 fed therefrom is located equally on opposite sides of the left-hand corner edge of the stacks of bricks passing through the form. However, since it is intended that the form 47 may be used with stacks of bricks having dimensions different from the stacks illustrated, the left-hand cartridge 282 is preferably adjustable laterally so that the left-hand strip 51 may be properly positioned with respect to the left-hand corner edge of stacks of various sizes.

As seen best in FIGS. 15 and 20, the two lower strips of material 51 are fed from the spools 281 through the tops of their cartridges 282 and pass partially around one of the rollers 221. Forwardly of this roller, the strips 51 have approximately one-half of their widths located below the stacks of bricks and the other half extending laterally outwardly from the sides of the stacks. As the strips 51 are fed along the corner edges of the stacks, the laterally outwardly extending portion of each is bent upwardly and against the side surfaces of the stacks. No separate guides or folders are required to perform this bending operation on the strips 51 because they are bent by the metal bands which are used to strap the stacks into packages, and which are brought up from the bottom of the stacks, as will hereinafter be apparent.

As is shown best in FIGS. 15, 18 and 19, the part of the protective strip applying means 52 which operates on the upper corner edges of the stacks passing through the form 47 includes two spools 286 of the protective strip material 51 mounted on the opposite ends of a shaft 287 located above the form 47. The shaft 287 is supported by two spaced brackets 288 each of which is connected between a forward angle member 289 and a rear channel member 290 extending horizontally across the top of the form 47. Each of the spools 286 is retained on the shaft 287 by an inner circular plate 291 and an outer circular plate 292 between which the spool is positioned, each of the plates 291 and 292 being fastened at its center to a collar 293 connected to the shaft 287 by thumb screws 294 so that the position of the spools 286 on the shaft 287 may be readily varied to suit different sizes of stacks.

By reference to FIGS. 15 and 24, it will be noted that the material 51, as it leaves one of the spools 286, first travels downwardly to a roller 295 supported by a bracket 296 from the rear horizontal member 290. From the roller 295 the strip 51 travels forwardly to a guide 297 which is adapted to bend the material at right angles along its center line and to hold the material so bent in engagement with one of the upper corner edges of the stacks of bricks passing through the form.

The construction of the guides 297 is shown in FIGS. 23 to 27, inclusive, wherein it will be noted that the guide includes a folder 298 mounted on a positioner 299. The folder 298 is preferably made of sheet metal and is so shaped as to receive the strip material 51 in a flat condition at its rear end 300 and to gradually fold the material about its center line as it travels the length thereof so that by the time it leaves the forward end 301 the material is bent at right angles to itself. To accomplish this the folder has along the major portion of each of its sides an inwardly turned flange 302 which is spaced from the main body of the folder 298 to provide grooves 303 for receiving the opposite edges of the strip 51. From the sectional views of FIGS. 25, 26 and 27 it is seen that near the inner end 300, the main body of the folder is flat and the grooves 303 open toward each other to thereby hold the paper strip in a flat condition at this point. Going from the inner end 300 to the outer end 301, however, the main body of the folder is gradually bent in such a manner as to bring the grooves 303 into a final right angular relationship with each other. Thus, the strip 51 which travels in the grooves 303 is accordingly gradually bent to a right angle as it travels the length of the folder. At its forward end 301 an outwardly extending bracket 305 is connected to the folder 298 for a purpose hereinafter described.

The positioner 299 serves to hold the folder 298 in proper relation to the corner of a stack of bricks. It includes a body member 306, to which the folder 298 is connected, and two guide shoes 307 that are connected to the body member 306 at right angles to each other. The upper guide shoe 307 is adapted to engage and ride on the upper surfaces of stacks of bricks passing through the form 47 and has its inner end portion bent upwardly at an angle to the horizontal, while the lower shoe 307 is adapted to simultaneously engage the side surfaces of stacks of bricks and has its rear end portion bent laterally outwardly at an angle to its forward end portion. Each guide 297 is maintained at the proper location along the length of the form 47 by a tie rod 308, see FIGS. 23 and 24, which is connected between the body member 306 of the positioner and the bracket 296.

As best seen in FIG. 19, the guides 297 are urged toward the corner edges of the stacks of bricks passing through the form by three helical coil springs 309. One of the springs 309 extends horizontally between the two guides 297 and is connected at each of its ends to the two brackets 305 of the guides. Each of the other springs 309 is connected to one of the guides 297 through its bracket 305 and to a lug 310 located on the form 47 a suitable distance below the guide. To support each of the guides when no bricks are in the form 47, a short length of chain 311 is connected between the guide 297 and the horizontal member 289, as shown in FIGS. 19 and 24.

Referring now to FIGS. 15 and 28 for a description of the strapping mechanism 49a, it will be observed that this unit is located adjacent the outer end of the form 47 and is adapted to apply a metal strap 312 around the stack of bricks that is projecting partially beyond the forward edge 274 of the vertical plate 225. That particular stack, as has been described above, is still held in a compacted condition within the form 47.

The illustrated strapping mechanism 49a is manufactured by the Acme Steel Company and is identified as the Standard E41A power strap feed assembly combined with a mounted steelstrapper and a steelstrap dispenser.

As best illustrated in FIG. 28, the dispenser 313 holds a coil of the strap material 312 and delivers the latter through a guide 313a. The strap extends from the guide to the bell mount 314b of the electrical power feed unit 314 which forces the strap longitudinally through a tubular track 315 shaped to extend around the stack of bricks to be packaged and upwardly in line with the gap 277 in the roller conveyor 48 to a limit switch 315a. This limit switch stops the operation of the power feed unit 314 when the strap end 312a extends a small distance beyond the switch. The tubular track 315 is formed with a slot which extends the full length of the same on its inner side to permit the strap to be disengaged from the track by the operator and drawn up tight around the stack of bricks. The power feed unit 314 is supported by a bar 316 that is clamped to a post 316a for horizontal swinging adjustments.

The hydraulically operated steelstrapper 317 is supported on a mounting 317a, clamped to the post 316a, by means of suitable linkage 318 which permits the steelstrapper to be adjusted both horizontally and vertically.

To apply a strap to a stack of bricks, the operator inserts the end of the strap material 312, supplied by the dispenser 313, into the bell mouth 314a of the power feed unit 314 and energizes the latter by means of a foot or hand operated switch, not shown. The unit 314 feeds the strap through the track 315 until the end 312a projects a short distance from the track, as shown in FIGS. 15 and 28, at which time the limit switch 315a will be actuated to open the circuit to the feed unit 314. The operator then, by pulling upwardly on the strap end 312a, may disengage the strap from the full length of the track 315 and insert the strap end into the steelstrapper 317 along with the associated portion of the strap extending from the dispenser 313. By actuating the valve handle 319 on the steelstrapper, the latter will function to draw the strap 312 up tight around the stack of bricks; fasten the overlapped portions of the tightened strap together by means of a metal clip which is deformed or crimped, simultaneously with the associated portions of the strap; and cut off the strap to provide another end portion, extending from the dispenser 313, for insertion into the bell mouth 314a of the power feed unit 314.

Figure 29:
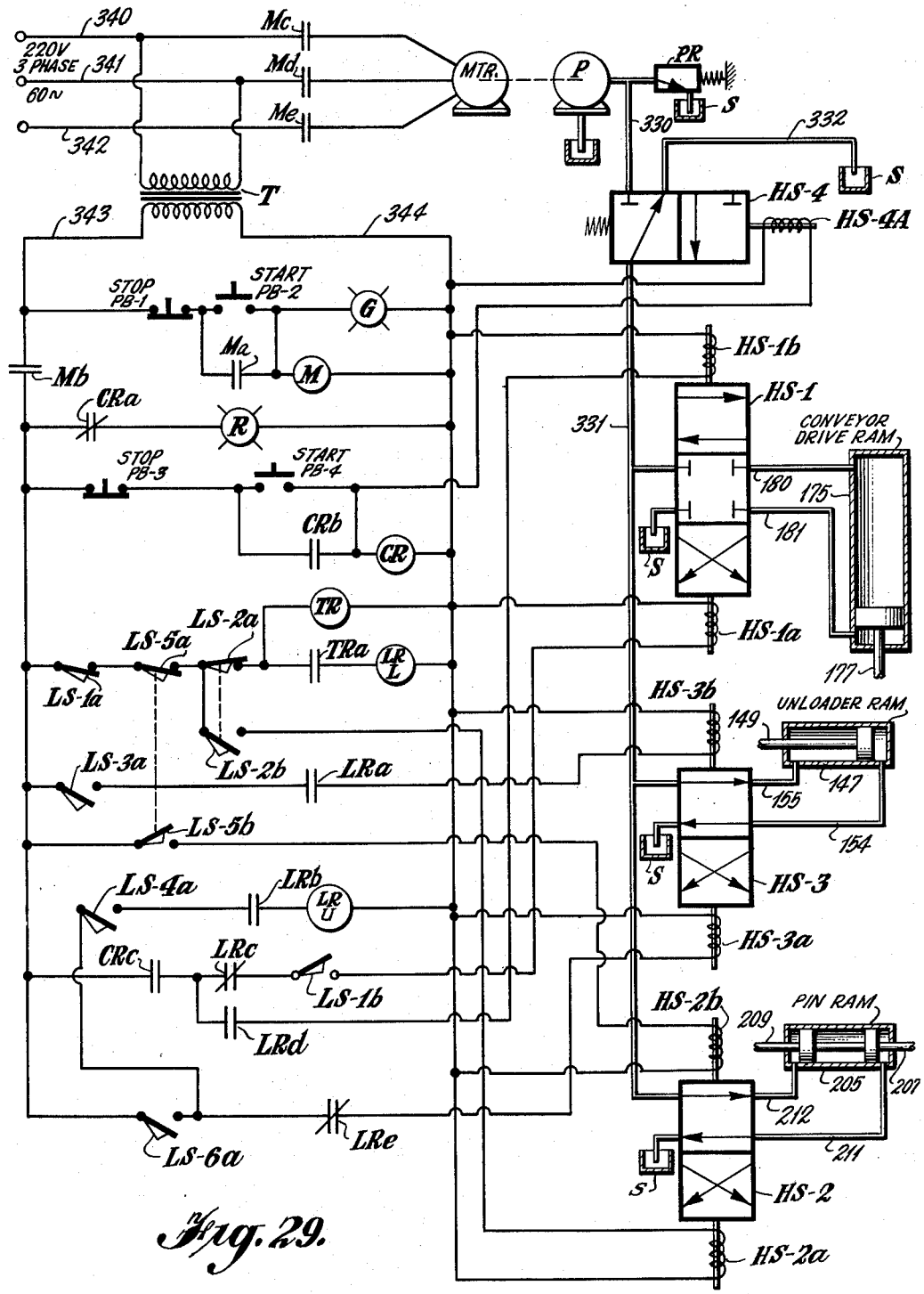
FIGURE 29 is a schematic diagram of the electro-hydraulic control system used in the machine of FIG. 1.

The operations of the conveyor drive ram 175, the unloader ram 147, and the pin ram 205 are controlled by an electrohydraulic system, shown schmatically in FIG. 29, in such a manner as to properly coordinate the movement of the jigs 42 with the operation of the unloader 45. From this figure, it will be noted that the hydraulic part of the control system includes a reservoir S which, for the purpose of simplifying the piping for the hydraulic fluid is repeatedly illustrated in small sections adjacent each control valve, a pump P driven by a motor MTR, and four solenoid actuated valves HS–1, HS–2, HS–3 and HS–4. In FIG. 1, these latter components are grouped together as a single integrated unit 325 which is mounted on top of the conveyor 41. When energized, the motor MTR drives the pump P which causes hydraulic fluid to be drawn from the reservoir S and delivered to an outlet line 330 at a selected operating pressure, as determined by a pressure regulating valve PR that is connected to the outlet line 330 and is adapted to return fluid to the reservoir S when the pressure in the outlet line exceeds the desired operating pressure. The outlet line 330 is connected to a header 331 through the valve HS–4, and the header is connected in parallel to the valves HS–1, HS–2, HS–3. The valve HS–4 is a spring biased two-position, three-connection directional valve. In its first position the port connected to the outlet line 330 is blocked while the port connected to the header 331 is open to the reservoir S through a return line 332. In the second position, which is obtained by energizing the solenoid HS–4A, the outlet line 330 and the header 331 are in open communication and the return line 332 is blocked.

The valve HS–1, which controls the operation of the conveyor drive ram 175, is a three-position, four-connection directional valve having a closed center position. When both of the solenoids HS–1A and HS–1B are deenergized the valve HS–1 assumes its center position at which all four ports are blocked. Actuation of the solenoid HS–1A, however, moves the valve to a position at which the header 331 is connected to the base end of the conveyor drive ram through the conduit 180 and the rod end of the drive ram is connected through the conduit 181 to the reservoir S. Hydraulic fluid is therefore supplied to the base end of the conveyor drive ram and vented from the rod end so as to cause extension of the piston rod 177. Energization of the solenoid HS–1B, on the other hand, moves the valve HS–1 to a position at which the header 331 is connected to the rod end of the drive ram through the conduit 181 with the conduit 180 being connected to the reservoir. In this case, therefore, hydraulic fluid is supplied to the rod end of the drive ram and vented from the base end so as to cause retraction of the piston 177.

The valve HS–2, which controls the pin ram 205, is a two-position, four connection directional valve. Actuation of the solenoid HS–2A moves the valve HS–2 to a position at which the header 331 is connected through the conduit 212 to the outer end of the pin ram 205 while the inner end of the pin ram is connected through the conduit 211 to the reservoir S. Hydraulic fluid is therefore supplied to the outer end of the pin ram 205 and vented from the inner end thereof so as to cause the drive pin 200, which is connected to the inner end of the piston rod 207, to be brought into driving engagement with the chain 65 and to cause retraction of the outer end 209 of the piston rod 207. The valve HS–2 will remain in this position even after the solenoid HS–2A is deenergized until the solenoid HS–2B is subsequently energized. Energization of the latter solenoid moves the valve HS–2 to its second position at which the header 331 is connected to the inner end of the pin ram through the conduit 211 and the outer end of the pin ram is connected to the reservoir through the conduit 212. Hydraulic fluid is therefore supplied to the inner end of the pin ram and vented from the outer end so as to cause movement of the pin 200 away from the chain 65 and extension of the outer end 209.

The valve HS–3 controlling the unloader ram 147 is a two-position, four connection directional valve similar to the valve HS–2. Energization of the solenoid HS–3A moves the valve HS–3 to a position at which the header 331 is connected through the conduit 155 to the rod end of the unloader ram and the base end of the ram is connected by the conduit 154 to the reservoir S. The valve HS–3 will remain in this position even after the solenoid HS–3A is deenergized and until the solenoid HS–3B is subsequently energized. Energization of the latter solenoid moves the valve HS–3 to its second position at which the header 331 is connected to the conduit 154 and the conduit 155 is connected to the reservoir S. Therefore, when the valve HS–3B is in its second position, hydraulic fluid will be supplied to the base end of the unloading ram 147 and vented from the rod end to cause extension of the piston rod 149.

The electrical part of the control system includes three supply lines 340, 341 and 342 which deliver 220 volt, three-phase, 60-cycle current to the motor MTR. Two of the three-phase supply lines, 340 and 341, are connected to a transformer T which delivers 110-volt current to the supply lines 343 and 344 between which various contacts, relays, and the valve solenoids are connected for controlling the operation of the valves.

It is believed that the electrical control circuit between the supply lines 343 and 344 may be more clearly described by considering the function of the circuit during one complete cycle of the stacking and strapping machine to which it is applied. FIG. 29 shows the condition of the control system at the start of the cycle at which time the piston rod 177 of the conveyor drive ram 175 is extended, the drive pin 200 is held in engagement with the chain 65 by the piston rod 207 of the pin ram 205, and the piston rod 149 of the unloader ram 147 is retracted.

Assuming that the machine has been completely shut down, the pump P is first started by pressing the start button PB–2 which energizes the relay M and lights the green light G, with energization of the relay M causing the contacts M$a$, M$c$, M$d$, and M$e$ to be closed. Closing of the contact M$a$ maintains a closed circuit through the relay M after the push button PB–2 is released, while the closing of the contacts M$c$, M$d$ and M$e$ energizes the motor MTR to drive the pump P. Energization of the relay M also closes the contacts M$b$ in the supply line 343 so as to condition the remainder of the circuit for subsequent operation. After the contacts M$b$ are closed, a circuit is completed to the red light R through the normally closed contacts CR$a$ to indicate the condition of the system at this point.

The closing of the contacts M$b$ also completes a circuit through the limit switch contacts LS–1$a$, LS–5$a$, and LS–2$a$ to a time delay relay TR, such as a series 305 "Atcotrol" timer manufactured by Automatic Timing and Controls, Inc., King of Prussia, Pennsylvania, which has a selectively variable delay period. The energization of the time delay relay TR initiates a time delay period, and after the running of this period the contacts TR$a$ are closed by the relay TR to complete a circuit to a latching relay LRL. Energization of the latching relay LRL closes the contacts LR$a$, LR$b$, and LR$d$, and opens the contacts LR$c$ and LR$e$.

The movement of the conveyor and unloader is started by depressing the start button PB–4 at some time after the operation of the start button PB–2. This closing of the start button PB–4 completes a circuit through the solenoid HS–4A and through the control relay CR. Energization of the solenoid operates the valve HS–4 to supply fluid to the header 331, while energization of the control relay CR opens the contact CR$a$ to turn off the red light R, and at the same time closes the contacts CR$b$ and CR$c$. Closing of the contacts CR$b$ completes a holding circuit to the control relay CR which maintains the latter energized after the start button PB–4 is released.

The effect of the closing of the contacts CR$c$ depends on when the start button PB–4 is operated. If the button PB–4 is depressed soon enough after the button PB–2 as to fall within the delay period of the time delay relay TR, no action will occur until the running of the delay period and the closing of the contacts LR$d$ by the latching relay LRL. On the other hand, if the button PB–4 is depressed after the depression of the button PB–2 and the running of the delay period, the contacts LR$d$ will be closed when the contacts CR$c$ are closed by operation of the button PB–4 and a circuit will be completed to the solenoid HS–1A to start the movement of the conveyor immediately upon the depression of the button PB–4.

Assuming that the button PB–4 is depressed shortly after the button PB–2 so that the contacts CRc are closed before the contacts LRd, after the lapse of the delay period the contacts LRd are closed, energizing the solenoid HS–1A to move the valve HS–1 to supply fluid to the conveyor drive ram 175 to cause retraction of the piston rod 177. As the piston rod 177 starts its retractive movement, the limit switch LS–1 is released causing the contacts LS–1a to be opened and the contacts LS–1b to be closed. Opening of the contacts LS–1a deenergizes the time delay relay TR and opens the contacts TRa to deenergize the latching relay LRL. The contacts LRa, LRb, LRc, LRd and LRe are, however, not affected by the deenergization of the latching relay LRL, but remain in the position to which they were moved by the latching relay when energized.

During the retraction of the drive ram piston 177, the drive pin 200 is in engagement with the chain and the jigs 42 are therefore moved along the conveyor. At the end of the retraction of the piston rod 177, the limit switch LS–3 is engaged by the arm 218 on the drive carriage 183. This closes the contacts LS–3a which completes a circuit through the now closed contacts LRa to the solenoid HS–3B. Energization of the latter solenoid moves the valve HS–3 to a position at which hydraulic fluid is supplied to the unloader ram 147 to cause extension of the piston rod 149 and forward movement of the unloader 45.

As the unloader 45 starts its forward movement, the limit switch LS–5 is released by the cam 165 on the unloader which causes the contacts LS–5a to be opened and the contacts LS–5b to be closed. It will be noted that the closing of the contacts LS–5b in turn completes a circuit to the solenoid HS–2B which moves the valve HS–2 to a position at which hydraulic fluid is supplied to the pin ram 205 to retract the pin 200 from the chain and extend the outer end 209 of the piston rod 207. Since the piston 177 of the drive ram is at this time retracted, this movement of the pin ram piston 207 will bring the outer end 209 thereof into engagement with the limit switch LS–4. This operation of the limit switch LS–4 closes the contacts LS–4a.

As was noted, the drive pin 200 is retracted and the limit switch LS–4 is operated as the unloader starts its forward movement. When the unloader reaches the end of its forward movement, the cam 165 thereon engages the limit switch LS–6 and closes the contacts LS–6a. A circuit is now completed through the contacts LS–6a, LS–4a and LRb to the unlatching relay LRU which causes the contacts LRa, LRb and LRd to be opened and the contacts LRc and LRe to be closed. The opening of the contacts LRa deenergizes the solenoid HS–3B, while at the same time the closing of the contacts LRe energizes the solenoid HS–3A. Therefore, the valve HS–3 is operated to supply fluid to the unloading ram 147 to retract the piston rod 149. In other words, as soon as the unloader 45 reaches the forward extent of its movement the engagement of the cam 165 with the limit switch LS–6 causes it to be immediately driven in the reverse direction towards its retracted position.

Also, the closing of the contacts LRc and the opening of the contacts LRd by the actuation of the unlatching relay LRU deenergizes the solenoid HS–1B and energizes the solenoid HS–1A which causes the valve HS–1 to be moved to a position at which the conveyor drive ram 175 is operated to extend the piston rod 177. It, therefore, will be seen that the extension of the drive ram piston rod 177 starts at the same time as the retraction of the unloader ram piston rod 149.

The opening of the contacts LRb by the energization of the unlatching relay LRU opens the circuit to the unlatching relay LRU and deenergizes the same. This however has no effect on the contacts LRa, LRb, LRc, LRd and LRe since the latter will remain in the position to which they are moved by the unlatching relay until the latching relay LRL is again energized.

At the start of the unloader retraction, the limit switch LS–6 is released and the contacts LS–6a are opened causing the solenoid HS–3A to be deenergized. At the end of the retractive movement of the unloader, the limit switch LS–5 is engaged, the contacts LS–5a are closed, and the contacts LS–5b are opened, the opening of the latter contacts causing the deenergization of the solenoid HS–2B.

As the piston 177 of the drive ram 175 starts to extend, the limit switches LS–3 and LS–4 are released and the contacts LS–3a and LS–4a are thereby opened. On the other hand, at the end of the drive ram extension the limit switches LS–1 and LS–2 are engaged, bearing in mind that the drive pin 200 is in a retracted position free of the chain during this extension of the drive ram and that the outer end 209 of the pin ram piston 207 is therefore extended so as to strike the limit switch LS–2 at the end of the extension stroke of the drive ram. The limit switch LS–2 is positioned so as to be actuated just slightly before the limit switch LS–1 to cause the contacts LS–2a to be opened and the contacts LS–2b to be closed. Shortly thereafter the limit switch LS–1 is engaged by the shoe 197 which causes the contacts LS–1a to be closed and the contacts LS–1b to be opened. The closing of the contacts LS–1a energizes the solenoid HS–2A which in turn moves the valve HS–2 to supply hydraulic fluid to the pin ram 205 to move the pin 200 into engagement with the chain and the outer end 209 of the piston rod 207 out of engagement with the limit switch LS–2. At the same time the opening of the contacts LS–1b deenergizes the solenoid HS–1A and thereby permits the valve HS–1 to return to its neutral central position at which all four ports are blocked.

As noted, however, the closing of the contact LS–1a causes the outer end 209 of the pin ram piston 207 to be moved away from the limit switch LS–2. This in turn causes the contacts LS–2a to be closed and the contacts LS–2b to be opened. The opening of the contacts LS–2b deenergizes the solenoid HS–2A. The closing of the contacts LS–2a, on the other hand, will initiate another cycle of the machine by energizing the time delay relay TR through the closed contacts LS–1a, LS–5a and LS–2a, with the time delay relay TR closing the contacts TRa after the lapse of a predetermined delay period which is preferably selectively variable to provide a delay period of about zero to 120 seconds. Therefore, it will be obvious that by varying this delay period the amount of dwell between the periods of jig movement may be varied to suit the output desired.

To temporarily stop the machine once it is started, a stop button PB–3 may be depressed, this opens the circuit to the control relay CR, closing the contacts CRa and opening the contacts CRb and CRc. The closing of the contacts CRa turns on the red light R, while the opening of the contacts CRb breaks the holding circuit to the control relay CR. The opening of the contacts CRc, on the other hand, will cause deenergization of whichever one of the solenoids HS–1A or HS–1B is actuated at the time the button PB–3 is depressed. Thus, the valve HS–1 is moved to its center position and the movement of the drive ram 175 is stopped immediately when the button PB–3 is actuated. Also, the operation of the button PB–3 opens the circuit to the solenoid HS–4A causing the valve HS–4 to be moved to a position at which the hydraulic outlet line 330 from the pump P is blocked from the header 331, thereby shutting off the supply of hydraulic fluid to the pin ram 205 and unloader ram 147, as well as the drive ram 175.

To completely shut down the machine either before or after its partial deactivation by the operation of the push button PB–3, the stop button PB–1 is actuated. This deenergizes the relay M and causes the contacts Ma, Mb, Mc, Md and Me to be opened. The opening of the contacts Ma breaks the holding circuit to the relay M, while the opening of the contacts Mc, Md, and Me disconnects the power supply from the motor MTR and stops the pump P. The opening of the contacts Mb, on the other hand, cuts off the supply of electrical energy to the remaining part of the control circuit. The machine will thereafter remain completely deactivated until the start buttons PB-2 and PB-4 are again operated.

Figure 30:
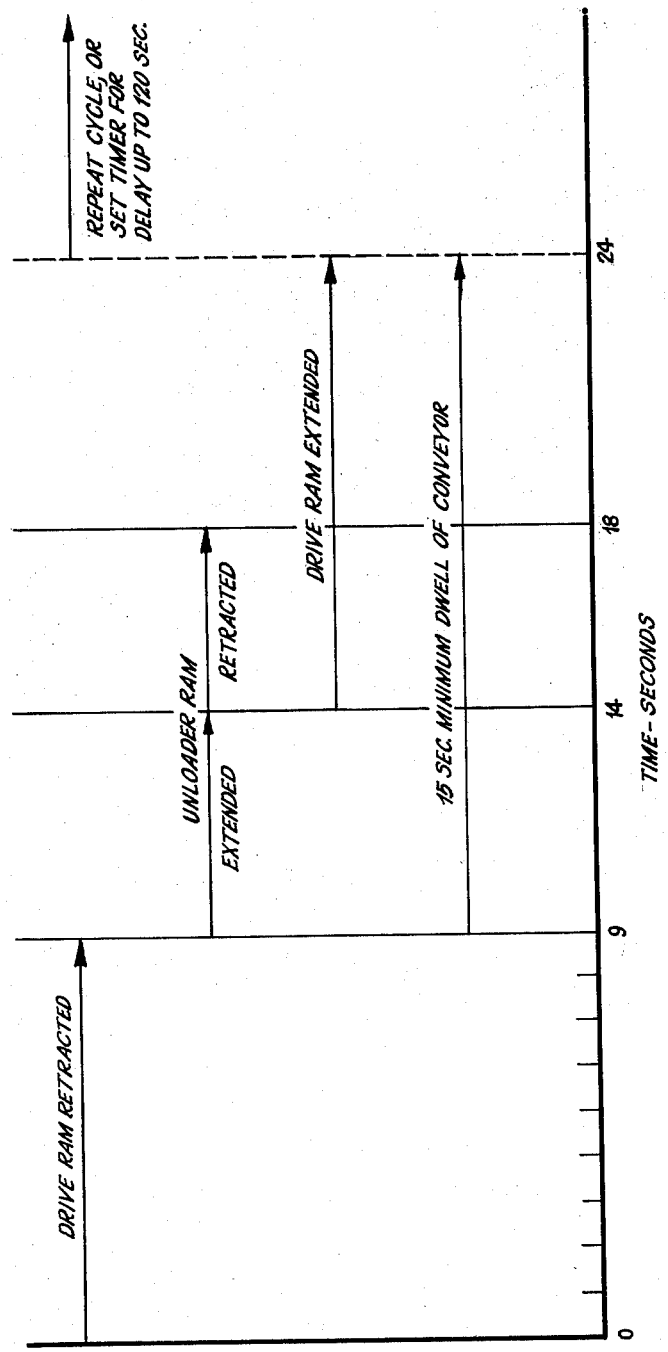
FIGURE 30 is a time cycle diagram illustrating the operating sequence of the various components of the machine of FIG. 1.

The operation of the stacking and strapping machine 40 may be briefly summarized by reference to FIG. 30 wherein the movements of the drive ram and the unloader ram are plotted against a time scale representing one cycle of operation. At the start of the cycle, the drive ram is in an extended position with the drive pin 200 in engagement with the chain, and the unloader is in a retracted position. During the first nine seconds of a cycle the drive ram is moved from its extended position to its retracted position causing each of the jigs 42 to be advanced a distance equal to the drive ram movement, thereby advancing a new jig to the unloader 45. At the end of the drive ram retraction, or nine seconds after the start of the cycle, the unloader ram is extended to push a stack of bricks from the jig in front of it, and this takes approximately five seconds. Immediately after it reaches its fully extended position, the unloader ram is retracted, which takes approximately four seconds, bringing the time from the start of the cycle to fourteen seconds at the end of the unloader ram's extension and to eighteen seconds at the end of its retraction. At the same time that the unloader ram starts its retraction, the drive ram starts to move from its fully retracted position to its extended position, which takes approximately ten seconds. During this latter movement of the drive ram, the drive pin 200 is out of engagement with the traction chain 65 so that no movement of the jigs 42 occurs. Therefore, as noted in FIG. 30, a fifteen-second minimum dwell of the conveyor occurs between nine seconds and twenty-four seconds from the start of the cycle. After the lapse of this fifteen-second minimum dwell period, the cycle may be repeated immediately or delayed an additional period of from zero to 120 seconds by proper adjustment of the time delay relay TR.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, I claim:

1. A machine for packaging articles, comprising a jig for receiving and supporting a plurality of articles in a given loosely stacked arrangement, means for conveying said jig along an endless path past a number of loading stations at each of which a desired number of articles are placed thereon to progressively build a complete stack of said given arrangement, unloading means at a station in the path of jig movement beyond said loading stations for removing a completed stack of loose articles from the jig, means at said unloading station for receiving the completed stack of loose articles as it is removed from said jig and including a second conveyor along which said unloaded stack of articles is advanced to a discharge point, and means associated with the second conveyor for applying a strap around the complete stack of articles in said given arrangement to form the latter into a self-sustaining package before it arrives at said discharge point.

2. A machine for packaging articles, comprising a jig for receiving and supporting a plurality of articles in a given loosely stacked arrangement, means for conveying said jig along an endless path past a number of loading stations at each of which a desired number of articles are placed thereon to progressively build a complete stack comprising a desired number of superimposed tiers, unloading means at a station in the path of jig movement beyond said loading stations for removing a completed stack of loose articles from the jig, means at said unloading station for receiving the completed stack of loose articles as it is removed from said jig and including a second conveyor along which said unloaded stack of articles is advanced to a discharge point, first means associated with the second conveyor for independently compacting the articles of each tier relative to each other as the stack is advanced along said second conveyor to eliminate spaces between the articles, and second means associated with the second conveyor for applying a strap around the compacted stack of articles to form the latter into a self-sustaining package before it arrives at said discharge point.

3. A machine for packaging articles, comprising a jig for receiving a plurality of articles in a given stacked arrangement, means for conveying said jig along an endless path past a number of loading stations at each of which a desired number of articles are placed thereon to progressively build a stack of rectangular shape in vertical section and comprising a desired number of superimposed tiers, unloading means at a station in the path of jig movement beyond said loading stations for removing a completed stack of articles from the jig, means at said unloading station for receiving the stack of articles as it is removed from said jig, means including a second conveyor along which said unloaded stack of articles is advanced to a discharge point, first means associated with the second conveyor for independently compacting the articles of each tier relative to each other as the stack is advanced along said second conveyor to eliminate spaces between the articles, second means associated with the second conveyor for applying a strip of protective material to each of the four corner edges of the stack said strip applying means being mounted for movement to center said strips on the corners of said stack irrespective of limited variations in the height and width thereof, and third means associated with the second conveyor for applying a strap around the compacted and edge protected stack of articles to form the latter into a self-sustaining package before it arrives at said discharge point.

4. An article packaging machine, comprising a conveyor adapted to travel an endless path and having a plurality of jigs connected thereto with each jig constructed to receive and support a plurality of articles in a given loosely stacked arrangement, means for advancing said conveyor with a uniform step-by-step movement so that the jigs will be stopped successively at a number of loading stations at each of which a desired number of articles are placed on each jig to progressively build thereon a complete stack of said given arrangement, unloading means at a station in the endless conveyor path beyond said loading stations and at which the jigs will be stopped successively for the removal from each of a completed stack of loose articles, means at said unloading station for receiving the completed stacks of loose articles as they are removed from said jigs and including a roller conveyor along which the said unloaded stacks are advanced in a step-by-step movement by each successive stack as it is unloaded onto the roller conveyor, and means associated with the roller conveyor for applying a strap around each stack of articles to form the same into a self-sustaining package before it arrives at the discharge end of the roller conveyor.

5. An article packaging machine as described in claim 4 further characterized by the means at said unloading station for receiving the completed stacks of loose articles including a stationary wall extending vertically from adjacent one side of the roller conveyor to the full height of the stacks of articles advancing therealong and horizontally the approximate thickness of several stacks of articles, and means positioned adjacent the opposite side of said roller conveyor and operative over an area substantially the same as that of said wall for compacting the articles of the stacks toward said wall as the stacks are advanced along the roller conveyor to eliminate spaces between the articles.

6. An article packaging machine, comprising a conveyor adapted to travel an endless path and having a plurality of jigs connected thereto with each jig constructed to receive a plurality of articles in a given loosely stacked arrangement, means for advancing said conveyor with a uniform step-by-step movement so that the jigs will be stopped successively at a number of loading stations at each of which a desired number of articles are placed on each jig to progressively build thereon a complete stack comprising a desired number of superimposed tiers, unloading means at a station in the endless conveyor path beyond said loading stations and at which the jigs will be stopped successively for the removal from each of a completed stack of loose articles, means at said unloading station for receiving the stacks of articles as they are removed from said jigs and including a roller conveyor along which the said unloaded stacks are advanced in a step-by-step movement by each successive stack as it is unloaded onto the roller conveyor, first means associated with the roller conveyor for independently compacting the articles of each tier relative to each other as the stacks are advanced along the roller conveyor to eliminate spaces between the articles, and second means associated with the roller conveyor for applying a strap around each stack of articles to form the same into a self-sustaining package before it arrives at the discharge end of the roller conveyor.

7. An article packaging machine, comprising a conveyor adapted to travel an endless path and having a plurality of jigs connected thereto with each jig constructed to receive a plurality of articles in a given stacked arrangement, means for advancing said conveyor with a uniform step-by-step movement so that the jigs will be stopped successively at a number of loading stations at each of which a desired number of articles are placed on each jig to progressively build thereon a stack of rectangular shape in vertical section and comprising a desired number of superimposed tiers, unloading means at a station in the endless conveyor path beyond said loading stations and at which the jigs will be stopped successively for the removal from each of a stack of articles, means at said unloading station for receiving the stacks of articles as they are removed from said jigs and including a roller conveyor along which the said unloaded stacks are advanced in a step-by-step movement by each successive stack as it is unloaded onto the roller conveyor, first means associated with the roller conveyor for independently compacting the articles of each tier relative to each other as the stacks are advanced along the roller conveyor to eliminate spaces between the articles, second means associated with the roller conveyor for applying a strip of protective material to each of the four corner edges of each of the stacks, said strip applying means being mounted for movement to center said strips on the corners of said stacks irrespective of limited variations in the height and width thereof, and third means associated with the roller conveyor for applying a strap around each stack of articles to form the same into a shelf-sustaining package before it arrives at the discharge end of the roller conveyor.

8. An article packaging machine, comprising a conveyor adapted to travel an endless path and having a plurality of jigs connected thereto with each jig constructed to receive a plurality of articles in a given stacked arrangement, means for advancing said conveyor with a uniform step-by-step movement so that the jigs will be stopped successively at a number of loading stations at each of which a desired number of articles are placed on each jig to progressively build thereon a stack of the desired arrangement, means for varying the length of time of the dwell period between successive operations of the conveyor advancing means, unloading means at a station in the endless conveyor path beyond said loading stations and at which the jigs will be stopped successively for the removal from each of a stack of articles, means to control the successive operations of the unloading means so they will occur one during each dwell period, means at said unloading station for receiving the stacks of articles as they are removed from said jigs and including a roller conveyor along which the said unloaded stacks are advanced in a step-by-step movement by each successive stack as it is unloaded onto the roller conveyor, and means associated with the roller conveyor for applying a strap around each stack of articles to form the same into a self-sustaining package before it arrives at the discharge end of the roller conveyor.

9. An article packaging machine as described in claim 8 further characterized by the means at said unloading station for receiving the stacks of articles including a stationary wall extending vertically from adjacent one side of the roller conveyor to the full height of the stacks of articles advancing therealong and horizontally the approximate thickness of several stacks of articles, and a plurality of spring loaded fingers positioned adjacent the opposite side of said roller conveyor and collectively operative over an area substantially the same as that of said wall for compacting the articles of the stacks toward said wall as the stacks are advanced along the roller conveyor to eliminate spaces between the articles.

10. An article packaging machine as described in claim 8 further characterized by the means at said unloading station for receiving the stacks of articles including a stationary wall extending vertically from adjacent one side of the roller conveyor to the full height of the stacks of articles advancing therealong and horizontally the approximate thickness of several stacks of articles, and a plurality of spring loaded fingers positioned adjacent the opposite side of said roller conveyor and collectively operative over an area substantially the same as that of said wall for compacting the articles of the stacks toward said wall as the stacks are advanced along the roller conveyor to eliminate spaces between the articles; and means positioned beyond the region of the stationary wall and the spring fingers for applying a strip of protective material to each of the four corners of all of the stacks of articles as they advance along the roller conveyor, said strip applying means being mounted for movement to center said strips on the corners of said stacks irrespective of limited variations in the height and width thereof.

11. An article packaging machine, comprising a conveyor adapted to travel an endless path and having a plurality of jigs connected thereto with each jig constructed to receive a plurality of articles in a given stacked arrangement, means for advancing said conveyor with a uniform step-by-step movement so that the jigs will be stopped successively at a number of loading stations at each of which a desired number of articles are placed on each jig to progressively build thereon a stack comprising a desired number of superimposed tiers, means for varying the length of time of the dwell period between successive operations of the conveyor advancing means, unloading means at a station in the endless conveyor path beyond said loading stations and at which the jigs will be stopped successively for the removal from each of a stack of articles, means for controlling the successive operations of the unloading means so they will occur once during each dwell period, means at said unloading station for receiving the stacks of articles as they are removed from said jigs and including a roller conveyor along which the said unloaded stacks are advanced in a sep-by-step movement by each successive stack as it is unloaded onto the roller conveyor, first means associated with the roller conveyor for independently compacting the articles of each tier relative to each other as the stacks are advanced along the roller conveyor to eliminate spaces between the articles, and second means associated with the roller conveyor for applying a strap around each stack of articles to form the same into a self-sustaining package before it arrives at the discharge end of the roller conveyor.

12. An article packaging machine, comprising a conveyor adapted to travel an endless path and having a plurality of jigs connected thereto with each jig constructed to receive a plurality of articles in a given stacked arrangement, means for advancing said conveyor with a uniform step-by-step movement so that the jigs will be stopped successively at a number of loading stations at each of which a desired number of articles are placed on each jig to progressively build thereon a stack of rectangular shape in vertical section and comprising a desired number of superimposed tiers, means for varying the length of time of the dwell period between successive operations of the conveyor advancing means, unloading means at a station in the endless conveyor path beyond said loading stations and at which the jigs will be stopped successively for the removal from each of a stack of articles, means for controlling the successive operations of the unloading means so they will occur one during each dwell period, means at said unloading station for receiving the stacks of articles as they are removed from said jigs and including a roller conveyor along which the said unloaded stacks are advanced in a step-by-step movement by each successive stack as it is unloaded onto the roller conveyor, first means associated with the roller conveyor for independently compacting the articles of each tier relative to each other as the stacks are advanced along the roller conveyor to eliminate spaces between the articles, second means associated with the roller conveyor for applying a strip of protective material to each of the four corner edges of each of the stacks, said strip applying means being mounted for movement to center said strips on the corners of said stacks irrespective of limited variations in the height and width thereof, and third means associated with the roller conveyor for applying a strap around each stack of articles to form th same into a self-sustaining package before it arrives at the discharge end of the roller conveyor.

13. An article packaging machine, comprising an overhead trolley conveyor adapted to travel an endless path, a plurality of jigs suspended from said conveyor with each jig constructed to receive a plurality of articles in a given vertically stacked arrangement, guide means positioned beneath and underlying the endless path of said trolley conveyor, means on the lower end portion of each jig engaging said guide means to restrict swing movements of the jigs, means for advancing said conveyor with a uniform step-by-step movement so that the jigs will be stopped successively at a number of loading stations at each of which a desired number of articles are placed on each jig to progressively build thereon a vertical stack of the desired arrangement, unloading means at a station in the endless conveyor path beyond said loading stations and at which the jigs will be stopped successively for the removal from each of a completed stack of loose articles, means at said unloading station for receiving the completed stacks of loose articles as they are removed from said jigs and including a roller conveyor along which the said unloaded stacks are advanced in a step-by-step movement by each successive stack as it is unloaded onto the roller conveyor, and means associated with the roller conveyor for applying a strap around each stack of articles to form the same into a self-sustaining package before it arrives at the discharge end of the roller conveyor.

14. An article packaging machine, comprising a conveyor along which stacks of articles are to be advanced, means for intermittently delivering loose stacks of said articles to one end of said conveyor and for advancing the previously delivered stacks in a step-by-step manner along said conveyor by each successive stack as the latter is delivered to said conveyor, means extending along the opposite sides of a portion of said conveyor for engaging each article at the adjacent side of the stack to compact the articles of the advancing stacks relative to each other to eliminate spaces between the articles, and means associated with the discharge end portion of said compacting means for applying a single strap around each compacted stack to form from the stacks into individual self-sustaining packages before the stacks arrive at the discharge end of said conveyor.

15. An article packaging machine, comprising a conveyor along which rectangular stacks of articles are to be advanced, means for intermittently delivering such stacks of articles to one end of said conveyor and for advancing the previously delivered stacks in a step-by-step manner along said conveyor by each successive stack as the latter is delivered to said conveyor, means extending along the opposite sides of a portion of said conveyor for confining the advancing rectangular stacks, means associated with the said confining means for applying a strip of protective material to each of the corner edges of said advancing rectangular stacks, said strip applying means being mounted for movement to center said strips on the corners of said stacks irrespective of limited variations in the height and width thereof, and means associated with the discharge and portion of said confining means for applying a strap around each stack and its corner edge protective material while the stack is still subject to the action of said confining means to form the stacks into individual self-sustaining packages before the stacks arrive at the discharge end of said conveyor.

16. An article packaging machine, comprising a conveyor along which rectangular stacks of articles are to be advanced, means for intermittently delivering loose stacks of said articles to one end of said conveyor and for advancing the previously delivered stacks in a step-by-step manner along said conveyor by each successive stack as the latter is delivered to said conveyor, a stationary wall extending vertically from adjacent one side of said conveyor to the full height of the stacks advancing therealong and the approximate thickness of several stacks, means positioned adjacent the opposite side of said conveyor and operative over an area substantially the same as that of said wall for engaging each article at the adjacent side of the stack to compact the articles of the stacks toward said wall as the stacks are advanced along said conveyor to eliminate spaces between the articles, and means for applying a single strap around each compacted stack to form the stacks into individual self-sustaining packages before the stacks arrive at the discharge end of said conveyor.

17. An article packaging machine, comprising a conveyor adapted to travel an endless path and having a plurality of jigs connected thereto with each jig constructed to receive a plurality of articles in a given stacked arrangement, means for advancing said conveyor with a uniform step-by-step movement so that the jigs will be stopped successively at a number of loading stations at each of which a desired number of articles are placed on each jig to progressively build thereon a stack of the desired arrangement, unloading means at a station in the endless conveyor path beyond said loading stations and at which the jigs will be stopped successively for the removal from each of a stack of articles, means at said unloading station for receiving the stacks of articles as they are removed from said jigs and including a roller conveyor along which the said unloaded stacks are advanced in a step-by-step movement by each successive stack as it is unloaded onto the roller conveyor, said last mentioned means including a stationary wall extending vertically from adjacent one side of the roller conveyor to the full height of the stacks of articles advancing therealong and horizontally the approximate thickness of several stacks of articles, and a plurality of spring loaded fingers positioned adjacent the opposite side of said roller conveyor and collectively operative over an area substantially the same as that of said wall for compacting the articles of the stacks toward said wall as the stacks are advanced along the roller conveyor to eliminate spaces between the articles, and means associated with the roller conveyor for applying a strap around each stack of articles to form the same into a self-sustaining package before it arrives at the discharge end of the roller conveyor.

18. An article packaging machine as described in claim 17 further characterized by means positioned beyond the region of the stationary wall and the spring fingers for applying a strip of protective material to each of the four corners of all of the stacks of the articles as they advance along the roller conveyor, said strip applying means being mounted for movement to center said strips on the corners of said stacks irrespective of limited variations in the height and width thereof.

References Cited in the file of this patent

UNITED STATES PATENTS

| | | |
|---|---|---|
| 1,303,359 | Moore | May 13, 1919 |
| 2,684,626 | Eberle | July 27, 1954 |
| 2,696,778 | Ervin | Dec. 14, 1954 |
| 2,718,972 | Temple | Sept. 27, 1955 |
| 2,812,708 | Tillinghast | Nov. 12, 1957 |
| 2,961,810 | Johnson et al. | Nov. 29, 1960 |